(12) United States Patent
Minh Le et al.

(10) Patent No.: US 10,223,080 B2
(45) Date of Patent: Mar. 5, 2019

(54) METHOD AND SYSTEM FOR AUTOMATED, STATIC INSTRUMENTATION FOR APPLICATIONS DESIGNED FOR EXECUTION IN ENVIRONMENTS WITH RESTRICTED RESOURCES

(71) Applicant: Dynatrace LLC, Detroit, MI (US)

(72) Inventors: Brian Duc Minh Le, Macomb, MI (US); Edward H. Klos, Lake Orion, MI (US); Clemens Fuchs, Gallneukirchen (AT); Dan Barr, Farmington, MI (US); Neal Thomas Leverenz, Macomb, MI (US)

(73) Assignee: Dynatrace LLC, Waltham, MA (US)

( * ) Notice: Subject to any disclaimer, the term of this patent is extended or adjusted under 35 U.S.C. 154(b) by 273 days.

(21) Appl. No.: 14/995,450

(22) Filed: Jan. 14, 2016

(65) Prior Publication Data
US 2016/0202960 A1    Jul. 14, 2016

Related U.S. Application Data

(60) Provisional application No. 62/103,349, filed on Jan. 14, 2015.

(51) Int. Cl.
*G06F 9/44* (2018.01)
*G06F 9/45* (2006.01)
(Continued)

(52) U.S. Cl.
CPC ............ *G06F 8/40* (2013.01); *G06F 11/3624* (2013.01); *G06F 11/3644* (2013.01)

(58) Field of Classification Search
CPC ................ G06F 8/40; G06F 11/3624–11/3644
See application file for complete search history.

(56) References Cited

U.S. PATENT DOCUMENTS 7,131,143 B1 * 10/2006 LaMacchia ............. G06F 21/51
  726/30
7,293,260 B1 * 11/2007 Dmitriev ............. G06F 11/3466
  714/E11.207

(Continued)

OTHER PUBLICATIONS

Shuai Hao, SIF: A Selective Instrumentation Framework for Mobile Applications, 2013, pp. 1-14. http://www-bcf.usc.edu/~halfond/papers/hao13mobisys.pdf.*

(Continued)

*Primary Examiner* — Mongbao Nguyen
(74) *Attorney, Agent, or Firm* — Harness, Dickey & Pierce, P.L.C.

(57) ABSTRACT

A system and method for automatic instrumentation of mobile applications is disclosed. Mobile applications are typically executed in mobile runtime environments or operating system that is restricted compared to their conventional counterparts. Those restrictions include features that allow one to examine and modify code of application during the runtime of the application. Those features that are used by instrumentation based monitoring systems dedicated for conventional applications are thus not available for the instrumentation of mobile application. The system and method allows for automatic instrumentation in a static way, either by persistently placing instrumentation code into mobile applications or by persistently adapting mobile applications in a way to perform a static instrumentation on application startup. The instrumentation code is placed in generic, application independent library code, but provides measurement and context data that allows one to determine specific business logic functionality using the instrumented generic library code.

17 Claims, 10 Drawing Sheets

Exemplary Monitoring Setup

(51) Int. Cl.
*G06F 8/40* (2018.01)
*G06F 11/36* (2006.01)

(56) References Cited

U.S. PATENT DOCUMENTS

| | | | | |
|---|---|---|---|---|
| 7,805,717 | B1* | 9/2010 | Spertus | G06F 8/48 717/130 |
| 8,464,225 | B2* | 6/2013 | Greifeneder | G06F 11/3644 717/130 |
| 8,478,948 | B2* | 7/2013 | Panchenko | G06F 11/3471 711/154 |
| 8,533,687 | B1* | 9/2013 | Greifeneder | G06F 11/3495 717/127 |
| 8,793,674 | B2* | 7/2014 | Ravi | G06F 8/443 717/158 |
| 9,326,145 | B2* | 4/2016 | Awan | H04L 63/107 |
| 9,594,662 | B2* | 3/2017 | Mani | G06F 11/3466 |
| 2003/0149960 | A1* | 8/2003 | Inamdar | G06F 11/362 717/118 |
| 2004/0040017 | A1* | 2/2004 | Kershenbaum | G06F 8/433 717/158 |
| 2005/0149719 | A1* | 7/2005 | Kilroy | G06F 8/52 713/152 |
| 2007/0168670 | A1* | 7/2007 | Dean | G06F 21/52 713/176 |
| 2007/0169055 | A1* | 7/2007 | Greifeneder | G06F 11/3476 717/158 |
| 2007/0180439 | A1* | 8/2007 | Sundararajan | G06F 11/3644 717/158 |
| 2008/0172661 | A1* | 7/2008 | Chatterjee | G06F 8/443 717/158 |
| 2008/0276227 | A1* | 11/2008 | Greifeneder | G06F 11/3624 717/130 |
| 2012/0174061 | A1* | 7/2012 | McCollum | G06F 8/33 717/106 |
| 2012/0304160 | A1* | 11/2012 | Soeder | G06F 9/4486 717/148 |
| 2012/0304172 | A1* | 11/2012 | Greifeneder | G06F 9/45504 718/1 |
| 2014/0344061 | A1* | 11/2014 | Choi | G06Q 30/0267 705/14.64 |
| 2014/0344792 | A1* | 11/2014 | Matov | G06F 9/45525 717/148 |
| 2015/0074653 | A1* | 3/2015 | Eracar | G01R 31/31908 717/129 |
| 2015/0248343 | A1* | 9/2015 | Ionescu | G06F 8/70 717/130 |
| 2015/0378756 | A1* | 12/2015 | Lensmar | G06F 8/53 717/148 |
| 2016/0062868 | A1* | 3/2016 | Mani | G06F 11/3466 717/130 |

OTHER PUBLICATIONS

Maamoun Bernichi, Software management based on mobile agent, 2007, pp. 1-6. https://ieeexplore.ieee.org/stamp/stamp.jsp?tp=&arnumber=4300036 (Year: 2007).*

Mike Ter Louw, Automated Execution Control and Dynamic Behavior Monitoring for Android Applications, 2013, pp. 968-973. https://ieeexplore.ieee.org/stamp/stamp.jsp?tp=&arnumber=6735749 (Year: 2013).*

Benoit Gaudin, Software Maintenance through Supervisory Control, 2011, pp. 1-9. https://ieeexplore.ieee.org/stamp/stamp.jsp?tp=&arnumber=6146914 (Year: 2011)*

Chengsong Wang, Research on Automatic Instrumentation for Bytecode Testing and Debugging, 2012, pp. 1-7. https://ieeexplore.ieee.org/stamp/stamp.jsp?tp=&arnumber=6272595 (Year: 2012).*

Andrea Avancini, Security Testing of the Communication among Android Applications, 2013, pp. 57-63. https://ieeexplore.ieee.org/stamp/stamp.jsp?tp=&arnumber=6595792 (Year: 2013).*

Kevin Benton, Studying the Effectiveness of Android Application Permissions Requests, 2013, pp. 1-6. https://ieeexplore.ieee.org/stamp/stamp.jsp?tp=&arnumber=6529497 (Year: 2013).*

* cited by examiner

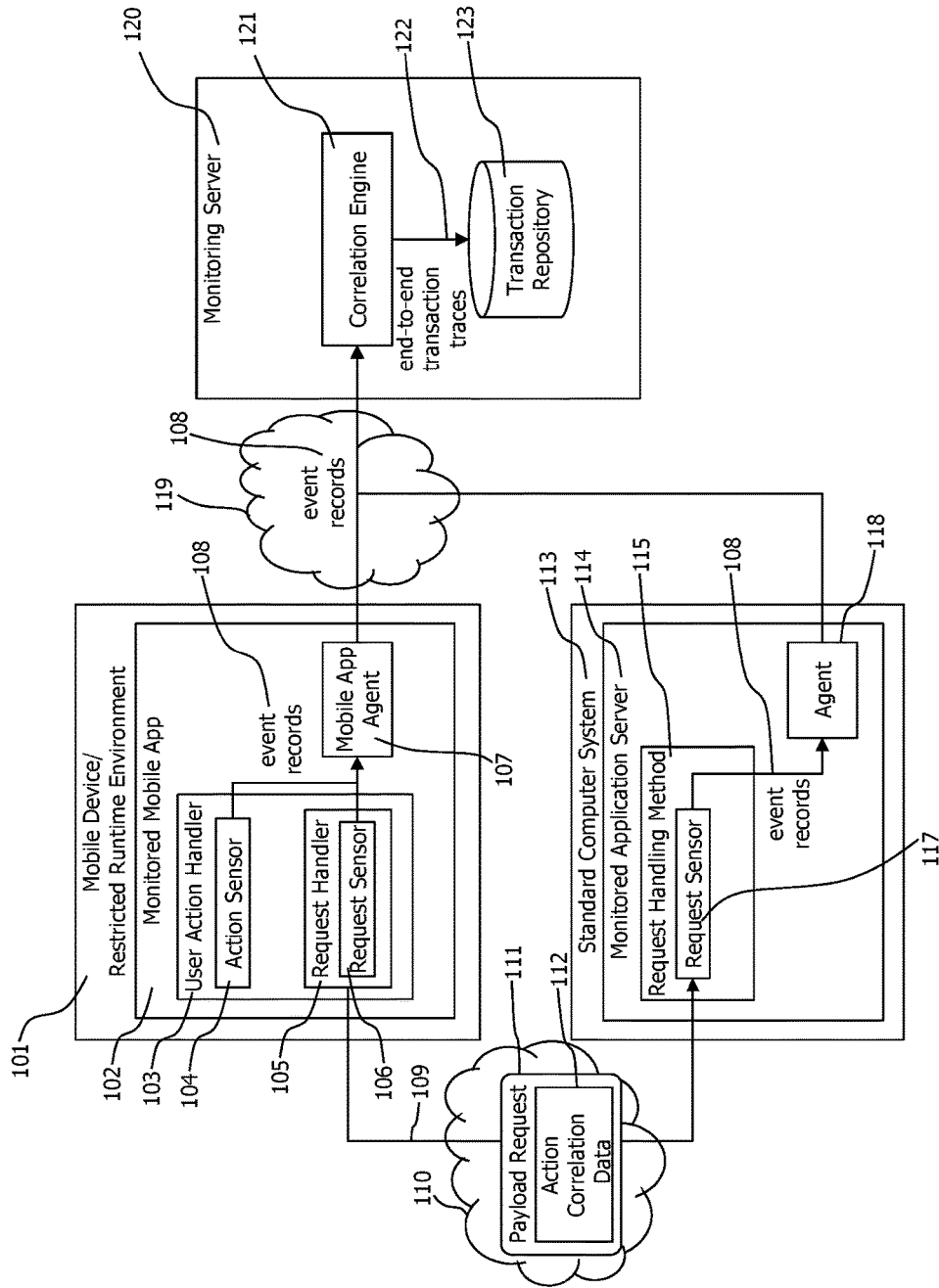
FIG 1: Exemplary Monitoring Setup

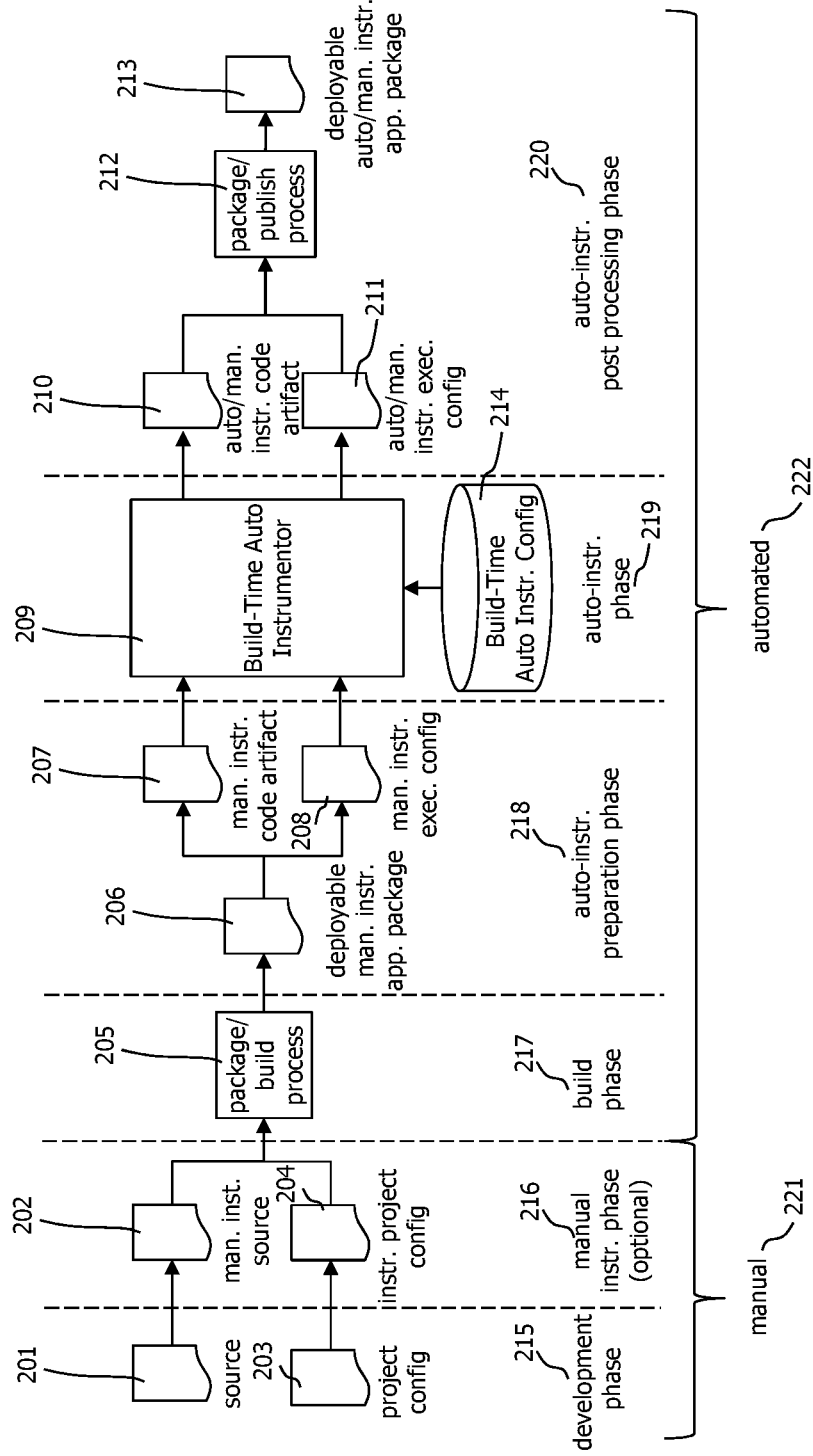
FIG 2: Build-Time Automated Instrumentation Pipeline

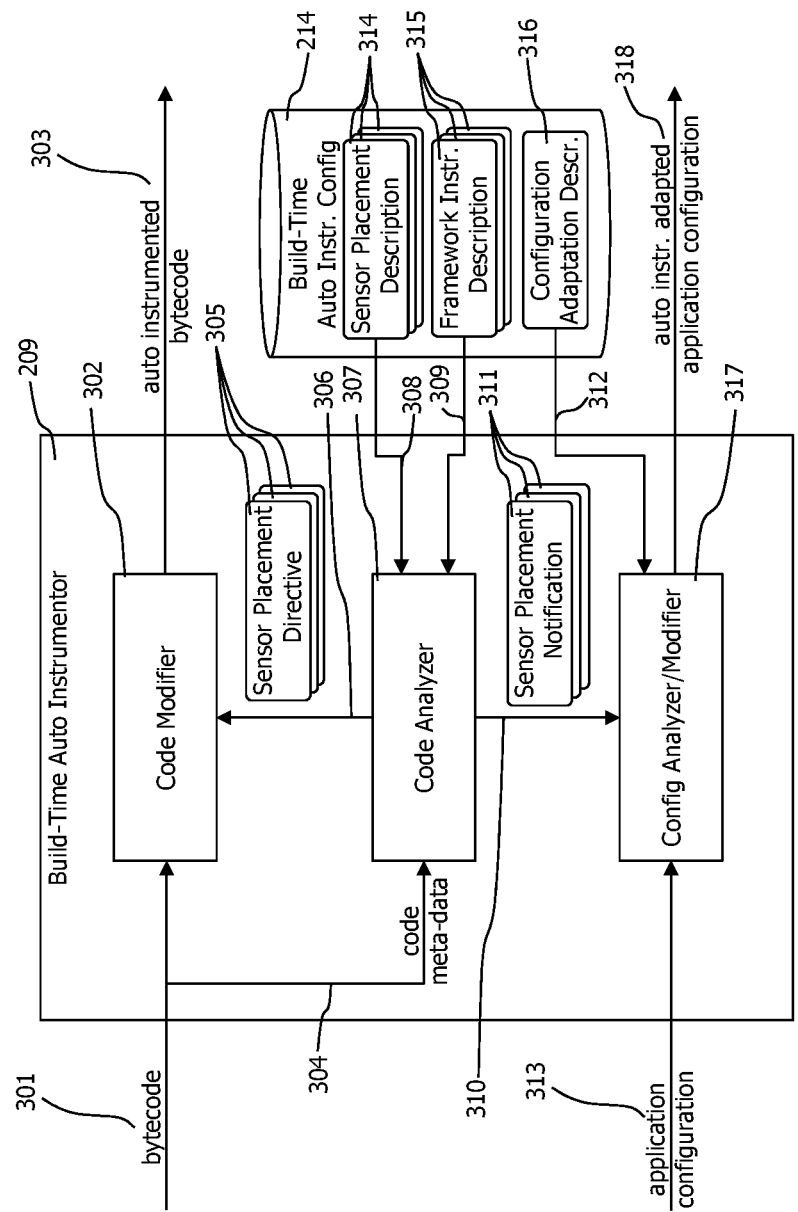
FIG 3: Build-Time Auto Instrumentor

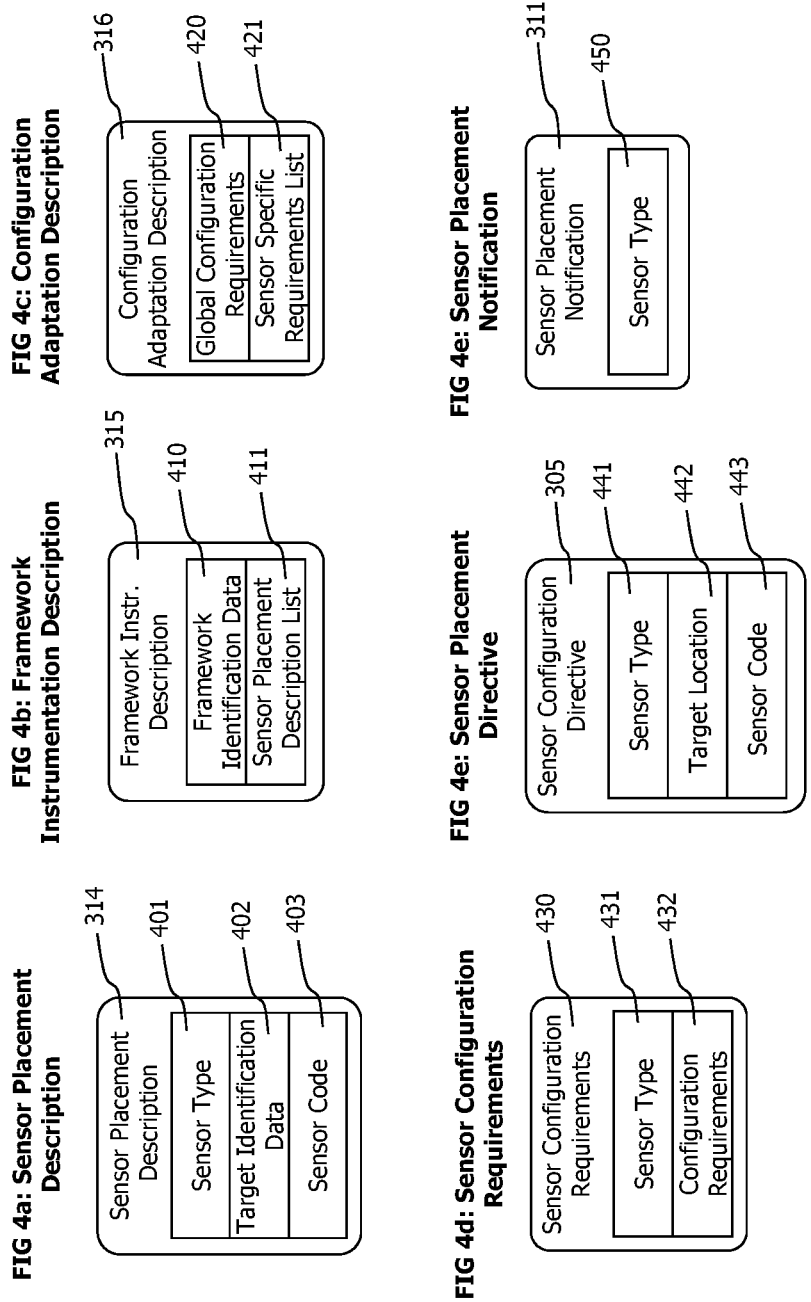

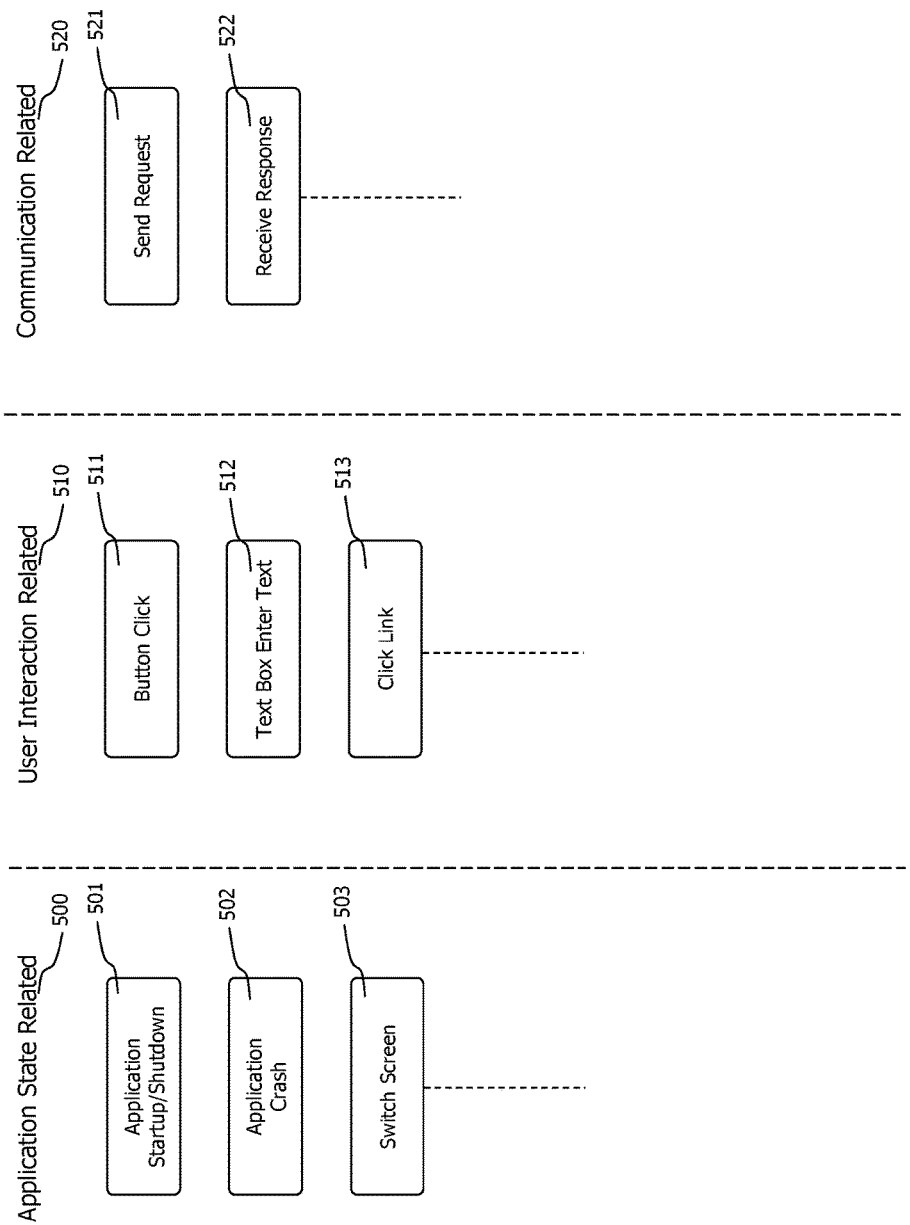
FIG 5: Exemplary Auto Instrumentation Targets

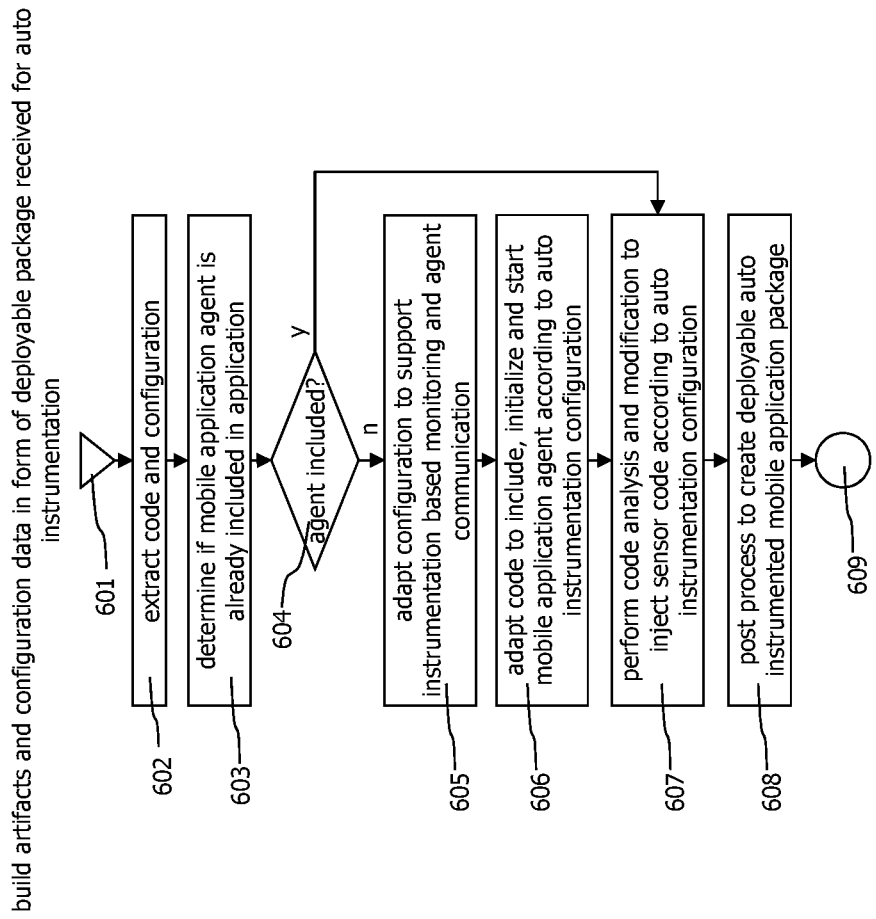

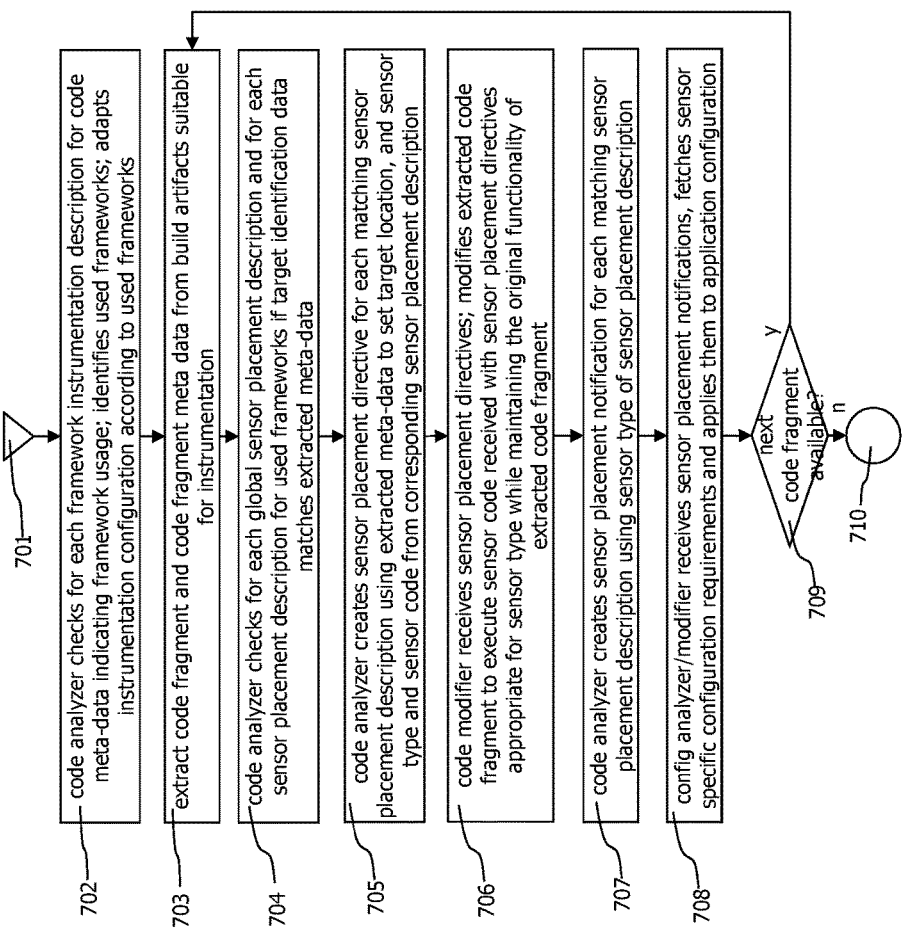

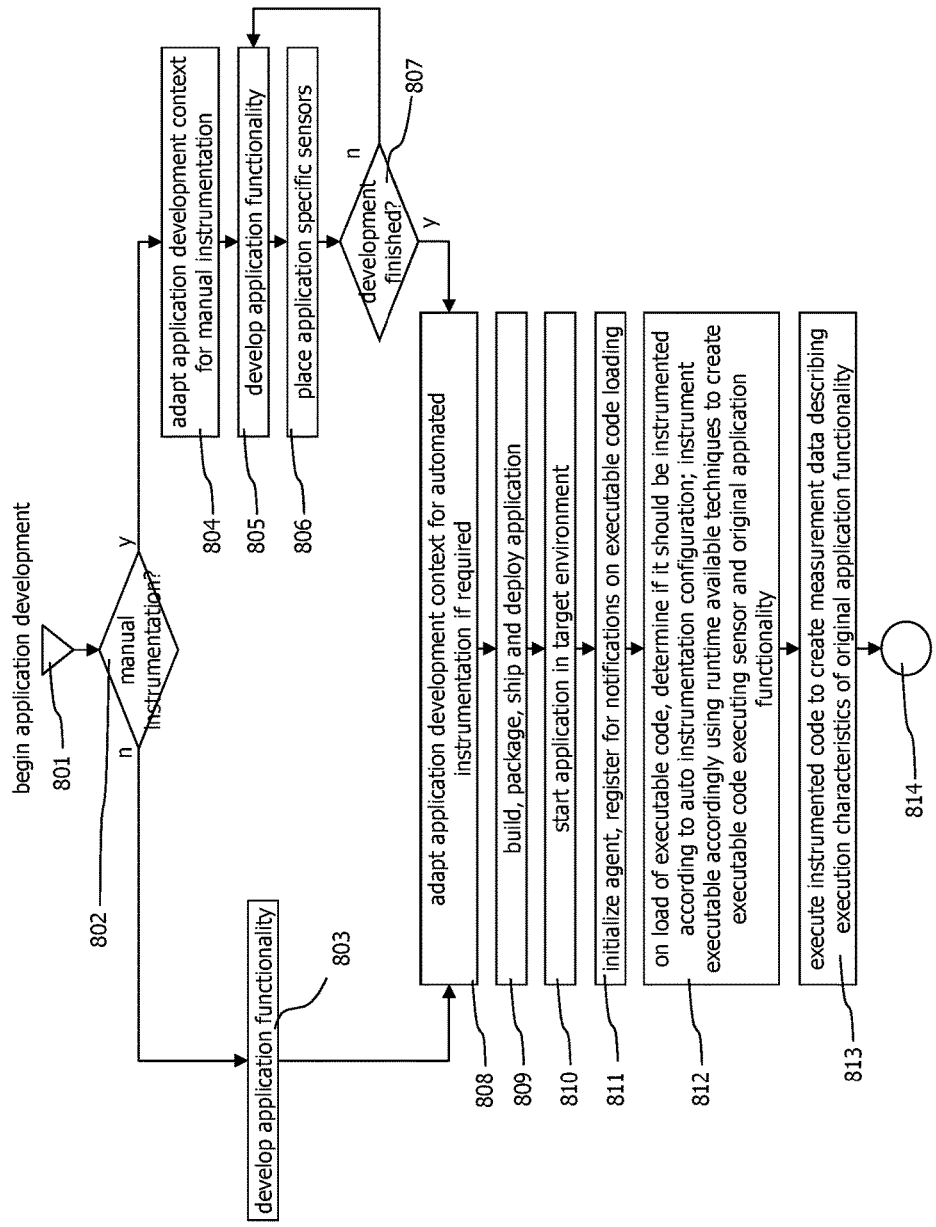
FIG 8: Variant Automated Static Instrumentation During Application Load-Time

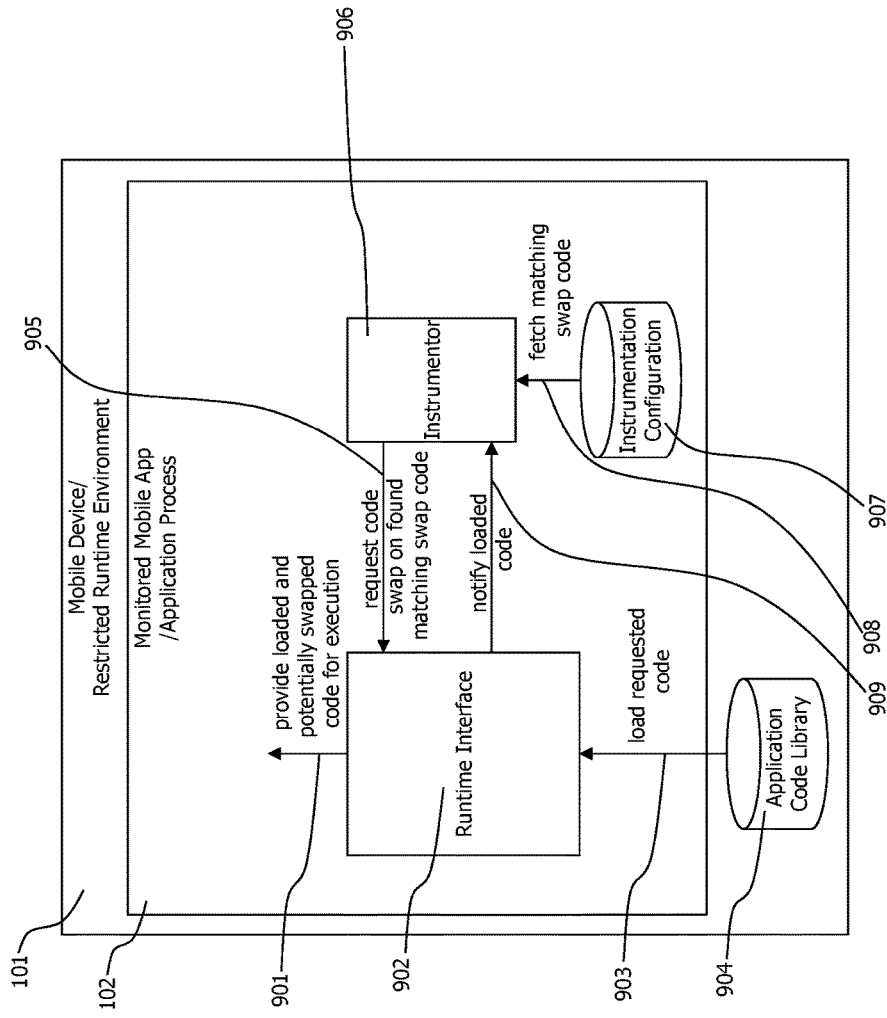
FIG 9: Variant Implementation Swapping Static Automated Application Load-Time Instrumentor

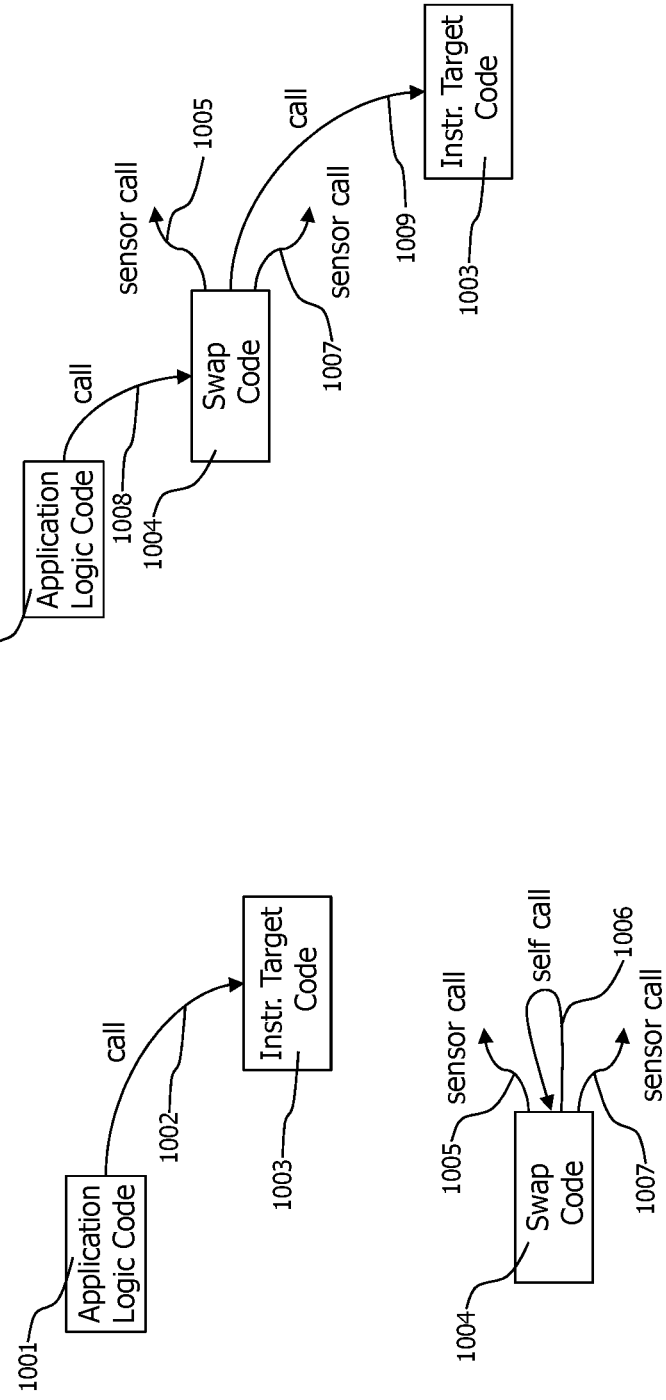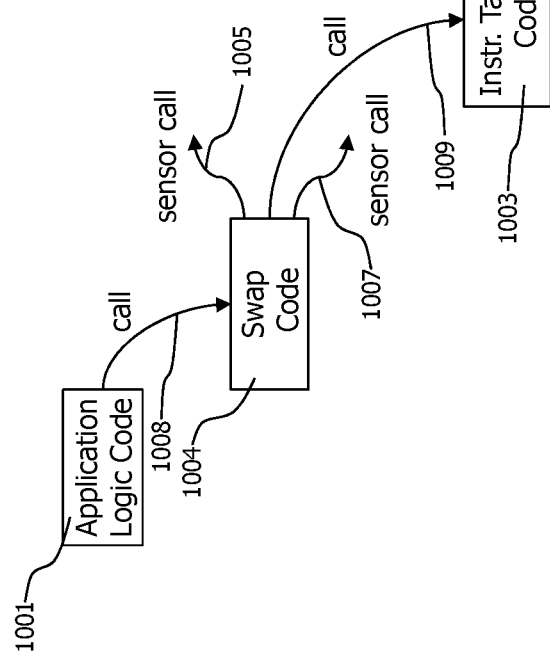

METHOD AND SYSTEM FOR AUTOMATED, STATIC INSTRUMENTATION FOR APPLICATIONS DESIGNED FOR EXECUTION IN ENVIRONMENTS WITH RESTRICTED RESOURCES

CROSS-REFERENCE TO RELATED APPLICATIONS

This application claims the benefit of U.S. Provisional Application No. 62/103,349 filed on Jan. 14, 2015. The entire disclosure of the above application is incorporated herein by reference.

FIELD

The presented disclosure relates to the field of automatically instrumenting application code to gain measurement data describing the performance of the instrumented application code and more specific to the automatic instrumentation of applications designed to run in restricted environments that do not allow the modification of application code at runtime of the application.

BACKGROUND

Mobile devices, like tablet computers and smart phones allow providers of web based applications and services like e-commerce applications to offer new user interface variants in form of mobile applications or apps. Those mobile applications are installed on a mobile device operated by the end user and communicate with backend, server side functionality of an application to provide application services in a way that is tailored to the needs of the application provider. Those mobile applications are also adapted to the resource and user interface requirements of the mobile device.

Typically, mobile devices also provide web-browsers, capable to display standard or mobile-device optimized application web-content, but a browser based user interface often lacks the flexibility and ease of use of a dedicated mobile application.

Mobile applications also allow to shift a portion of the functionality of the application from backend servers to the mobile device, to improve the performance of the application perceived by the end user, e.g. by reducing the number of server round-trips required to perform application functionality.

As the mobile application represents an important interface to the end user and is relevant for the user perception regarding functionality, reliability and performance of the whole application, visibility to functionality and performance delivered by the mobile application becomes an important requirement for operators of applications and services including a mobile application based interface variant.

Another category of devices that typically only provide restricted resources for the execution of applications are TV Set Top Boxes. Although those devices are typically not mobile, requirements like small size, low price and low or no noise emission during operation, dictate a small hardware footprint of such devices which in turn only allows to provide a restricted set of resources and capabilities for the execution of applications.

Next to the two here described device categories, other types of devices may exist which have to cope with similar requirements and that in turn also provide application execution environments with restricted resources and capabilities.

The described limitations and proposed solutions to allow the instrumentation of applications running in those environments may also be applied to devices of those types.

The execution environment of such mobile devices is designed to cope with limited hardware resources and optimized for low power consumption. As a consequence, features available in standard execution environments that are used by monitoring systems to instrument application code to gain visibility into behavior and performance characteristics of the application are not available. As an example, dynamic instrumentation of bytecode or other intermediate code during application runtime is typically not available in mobile environments.

To overcome this limitations, some monitoring systems provide infrastructure to manually augment the source code of a mobile application with instrumentation code. With this approach, developers manually place sensor calls into the source code of the application. Those sensors calls do not influence the designed functionality of the application, but they determine and report operating conditions of application functionality, like its CPU or memory consumption, or execution duration and thus provide insight into the internal conditions of application functionality. Consequently, the source code of the mobile application already contains calls to sensor code that gathers and provided monitoring data describing functionality and behavior of the application. However, placing those sensor calls in application source code tends to be cumbersome, repetitive and error prone manual work.

A solution is desired that reduces the requirement of manually placed sensors to a minimum while providing the required visibility into functionality and performance of the monitored mobile applications.

This section provides background information related to the present disclosure which is not necessarily prior art.

SUMMARY

This section provides a general summary of the disclosure, and is not a comprehensive disclosure of its full scope or all of its features.

The disclosed instrumentation technology for mobile applications is directed to automatically create statically instrumented mobile application code adapted to the functionality of the application. In contrast to instrumentation systems that perform dynamic instrumentation of application code, like the system described in U.S. Pat. No. 8,464,225 "Method and System for Adaptive Generic Code Instrumentation Using Run-Time or Load-Time Generated Inheritance Information for Diagnosis and Monitoring Application Performance and Failure", which analyzes and manipulates application code in volatile main-memory during the execution of the application and does not create permanent instrumentation, static instrumentation analyzes and manipulates application code once before execution of the application and permanently replaces the original version of application code with an instrumented version. Sensor code injected by the automatic instrumentation process shares sensor infrastructure functionality, like functionality to communicate with an external monitoring server, with manually placed sensor code and thus provides resource saving coexistence of automatic and manual instrumentation.

Mobile applications, like other applications, typically rely on functionality provided by common libraries that provide basic user interface and communication functionality, like e.g. functionality to display and interact with user interface components like text boxes, menus or buttons or functionality to send requests and to receive responses over a computer network. This basic functionality is used to build the business logic of mobile applications.

Those libraries are used by a multitude of mobile applications, they are public available, their interfaces are relatively stable, and their functionality and interfaces are well documented. Knowledge about those libraries may be used by an automated instrumentation process to identify code parts that perform specific functionality and in a second step, to modify this code parts by instrumenting them with sensor code appropriate for the preformed functionality. The instrumented code may then be used by the mobile application instead of the original code. As the analysis and instrumentation uses only static, structural data of those libraries and requires no runtime specific data, the code modification can be performed prior to the runtime of the mobile application and thus circumvents missing abilities to modify code during runtime of the mobile application or after the mobile application was installed on a mobile device.

Sensor code, which is placed into existing code to acquire measurement data describing the performance and functionality characteristics of the mobile application, requires sensor independent, monitoring related functionality to e.g. communicate with an external monitoring server to send measurement data or to receive sensor configuration data. This sensor independent functionality may be used by a multitude of different sensors and may thus be provided in a sensor independent module e.g. in form of an agent. This agent may be injected into the mobile application and act as communication interface between different sensors and an external monitoring server. The agent may also decouple the thread execution context in which transactions and sensors are executed from the thread execution context which sends measurement data to an external monitoring server.

The automated instrumentation process may also insert such an agent into the monitored application that provides this sensor independent functionality. In contrast to sensor code, which is placed by modifying code executed by the mobile application to e.g. perform business logic, the agent is only added to the mobile application, but it does not directly interact with the business logic code of the mobile application. It only interacts with sensors placed in the business logic code to e.g. receive measurement data acquired from sensors and to forward sensor configuration data, e.g. received from an external monitoring server, to sensors. The agent may be injected into the mobile application in a way that it is accessible by placed sensor code and that it gets initialized on startup of the monitored application. Initialization of the agent may e.g. include establishing a connection to a monitoring server to receive initial sensor configuration data and to startup a mechanism to send measurement data to a monitoring server in a way that is decoupled from sensor execution.

Some embodiments of the presented technology may also allow to selectively disable individual sensors or all sensors of a specific type. Deployed sensors may on startup of the application register with the agent, the registration data may contain the type of the sensor and name of class and method it is deployed to. The agent may send this registration data to the monitoring server, which may present the instrumented sensors to the user in form of a list. The user may select one or multiple of those sensors from the list and mark them as disabled. The monitoring server may send a command to the agent that notifies it about the disabled sensors, and the agent may on receipt of the command disable the selected agents. This feature allows to selectively disable specific sensors that are currently not required, without the need to dynamically alter the application bytecode to remove them.

The automated instrumentation process may also applied to a mobile application which already contains manually placed sensors. As the manually placed sensors also require agent functionality, agent code is already contained in the monitored application in this case. The automated instrumentation process may detect whether the monitored application already contains an agent and only add code representing the agent if it is missing. Adding agent code in case it is already available in the code of the mobile application may in best case lead to unnecessary increase of the size of the mobile application code and in worst case create an invalid and not running mobile application.

To determine the existence of an agent in the mobile application, the instrumentation process may e.g. extract meta-data describing portions of the code of the mobile application and compare it with meta-data identifying the agent. The meta-data extracted for the determination of the existence of an agent in a monitored application may e.g. include names of packages and classes existing in the mobile application.

Runtime environments of mobile devices differ by mobile device vendor and also by the type of code that can be executed on those runtime environments differs. In turn, different types of code require different approaches for an automated instrumentation processes. The currently most important types of mobile runtime environments according to market share are Android® provided by Google Inc. and iOS provided by Apple Inc. For TV Set Top Boxes, adapted versions of those runtime environments like Android TV® or Google TV by Google Inc., or tvOS by Apple Inc. exist. Despite a more segmented market in the TV Set Top Boxes market and the availability of more alternative operating systems and runtime environments, the offerings by Google Inc. and Apple Inc. are currently the most important ones.

Android applications are similar to conventional Java® applications. Those applications are available in a bytecode format optimized for the execution on mobile devices. This bytecode format provides meta-data to identify code portions and the functionality of those code portions. In addition, functionality to manipulate existing portions of this bytecode to e.g. create instrumented bytecode is available. An automated instrumentation process dedicated to Android applications may use this features.

Mobile applications written for iOS are available in form of object-code which is interpreted and executed by the iOS runtime environment. Although also object-code contains specific meta-data, format and structure of this object-code are not available in a form that allows reliable extraction of this meta-data. Direct modification of the object-code to create automatic instrumented installable application packages, as it is performed for bytecode based applications is not possible for object-code.

However, the iOS runtime environment provides mechanisms to swap the code referred by a method identifier with the code referred by another method identifier during runtime of the mobile application. An automated instrumentation process dedicated to iOS applications may use this feature to exchange original method calls by wrapping method calls that execute the original method calls in combination with sensor code to gather measurement data describing performance and functional behavior of the original application.

A requirement for both the instrumentation of iOS and Android based application is that the fact that an application is instrumented should be hidden from the end-user of the application. In contrast to the instrumentation of server or backend side processes, like application servers, which are typically maintained by operational personal which is able to manipulate the runtime conditions of those backend processes to e.g. enable, disable or change the instrumentation of those processes, the instrumentation of mobile and similar applications that are typically operated by end-users of an application should not require any interaction by an user. For those mobile or similar applications that represent the used by the end user to interact with the services provided by the application, the presence of instrumentation should be hidden from the end-user. No operation by the end-user, like adaptation of start configurations of the mobile application should be required to instrument the application. A way to provide such end-user transparent instrumentation functionality, as in detail described below is to provide application versions that are already preconfigured, with an agent that automatically connects to a monitoring server, and code that is either already instrumented with sensor calls prior to application execution, or that is prepared to automatically and without user interaction places required sensor calls during startup of the application.

Further areas of applicability will become apparent from the description provided herein. The description and specific examples in this summary are intended for purposes of illustration only and are not intended to limit the scope of the present disclosure.

DRAWINGS

The drawings described herein are for illustrative purposes only of selected embodiments and not all possible implementations, and are not intended to limit the scope of the present disclosure.

FIG. 1 provides an overview of an exemplary monitoring system consisting in agents deployed to a mobile application and a backend application process, and a monitoring server receiving transaction trace data fragments to create end-to-end transaction trace data.

FIG. 2 shows an overview in form of a data-flow diagram of a build-time automated instrumentation process as it may be performed for Android applications.

FIG. 3 provides a block diagram of the build-time auto instrumentor which analyzes application bytecode and modifies it to create instrumented bytecode. In addition, the auto instrumentor adapts the configuration of the application to enable features required to monitor the application.

FIG. 4 conceptually describes data records that may be used to control bytecode instrumentation and application configuration adaptation.

FIG. 5 shows examples of user interface and communication functionality that may be target for auto instrumentation.

FIG. 6 provides a flow chart that conceptually describes the transformation process that creates an automatically instrumented mobile application out of a not instrumented or manually instrumented mobile application.

FIG. 7 shows a flow chart that describes the instrumentation of individual bytecode portions according to instrumentation rules.

FIG. 8 describes the process of auto instrumenting a mobile application using runtime swapping of method implementations for method identifiers as it may be used for iOS applications.

FIG. 9 provides a block diagram of a mobile application prepared for load-time auto instrumentation using runtime swapping of method implementations.

FIG. 10 graphically describes the concept of method implementation swapping.

Corresponding reference numerals indicate corresponding parts throughout the several views of the drawings.

DETAILED DESCRIPTION

Example embodiments will now be described more fully with reference to the accompanying drawings.

The described embodiments are directed to provide instrumentation technologies for applications designed for runtime environments that do not provide mechanisms for dynamic, run-time code manipulation. The mechanisms required for dynamic run-time code manipulation include the existence of meta-data describing executable code, the availability of this meta-data during application execution, and the ability to inject executable and to alter existing executable code in main-memory before or during execution of the application.

There are various reasons for vendors of mobile runtime environments or operating systems to not provide those mechanisms. The two most important ones are the possibility to use those features to attack the mobile device to execute malicious code and the additional resources required to provide those features which would impact manufacturing costs and battery time.

Referring now to FIG. 1, which depicts a simplified setup of a monitoring system consisting in a monitored mobile app 102, executed on a mobile device 101, a monitored application server 114, executed on a standard computer system 113 and a monitoring server 120.

The monitored mobile app 102 contains a user action handler 103, which e.g. connected with a user interface component of the monitored application 102, like a GUI button or a text field. The user action handler 103 is executed on activation of the connected user interface component, by e.g. clicking the button or entering text to the text field. The user action handler 103 executes specific mobile app side business logic and may then invoke a request handler 105 that sends a payload request 111 over a connecting computer network 110 to a monitored application server 114 residing on a standard computer system 113. The monitored application server 114 forwards the payload request to a request handling method 115 that processes the request and returns a corresponding response.

An action sensor 104 is instrumented to the user action handler 103, that recognizes the execution of the user action handler and that captures data identifying the type of the user action handler, like the name of the user action handler or the name of its connected user interface component. The user action handler is notified about an activation of its connected user interface component via GUI library functionality. The action sensor 104 may in some embodiments not be placed in user action handler specific code, but in the user action and application independent notification code of the used GUI library to allow application independent and automated instrumentation. Some other embodiments may use knowledge of interfaces defined by application independent code to connect GUI components with business logic to instrument application specific code. As an example, the auto instrumentation code may be implemented and configured in a way that it identifies classes implementing the interface "android.view.View.OnClickListener", like e.g. a class "MyPurchaseClickListener". Knowledge about the interface "android.view.View.OnClickListener" may be used to determine that the implementing class "MyPurchaseClickListener" has to implement a method "onClick( )" which may be instrumented by the auto instrumentation process.

The request handler 105 called by the user action handler 103 is also instrumented by a request sensor 106, which detects the sending of the payload request 111 and which may tag the payload request 111 with action correlation data 112 that can be used to correlated tracing data describing the monitored mobile app 102 side processing of a monitored transaction with the tracing data describing the monitored application server 114 side processing of the monitored transaction. The request sensor 106 may be placed in application independent library code that is used by the user action handler to send a payload request 111. Both action sensor and requests sensor create event records 108 that describe the activation of a user action handler or the sending of a request by a user action handler. The event records 108 created by the sensors are sent to a mobile app agent 107, that sends them to a monitoring server 120 via a connecting computer network 119.

The request handling method 115 of the monitored application server 114 is instrumented with a request sensor 117 that recognizes the reception and processing of the payload request 111 and creates and sends event records 108 describing the received payload request and its processing to an agent 118 instrumented to the monitored application server 114. The agent 118 forwards the received event records 118 to the monitoring server 120 via a connecting computer network 119. The monitoring server 120 forwards the received event records to a correlation engine 121 which incrementally creates end-to-end transaction traces 122 describing individual transactions performed by the monitored mobile app in cooperation with the monitored application server 114. The end-to-end transaction traces 122 are stored in a transaction repository 123 for subsequent analysis or visualization.

The functionality of sensors and agents on monitored application server side and monitored app side in terms of transaction monitoring and tracing data are similar. However, placing of sensors and injection of agents substantially differs due to the restrictions of the runtime environment of the mobile app.

The monitored application server 114 may be run on top of a virtual machine like e.g. a Java® virtual machine, which provides mechanisms to inject agent code and to manipulate bytecode of a monitored application server 114 during run-time.

Those mechanisms are not available on a mobile device 101, and dynamic, on-the-fly instrumentation is not available in this case. The instrumentation of mobile app code has to be performed before the app is started and potentially even before the mobile app is installed on the mobile device.

FIG. 2 conceptually depicts an exemplary data flow of code and corresponding configuration data of a mobile app to create an automatically instrumented mobile app in a form that is ready to get installed on a mobile device. The transformation process shown in FIG. 2 is directed to the instrumentation of mobile apps based on an intermediate code format, like bytecode or a bytecode derivate optimized for execution of a mobile device, like e.g. mobile apps designed for the Android® mobile operating system. The process starts with a development phase 215, in which source code 201 and project configuration 203 defining business logic and user interface of the mobile app are manually designed by one or multiple developers. After the development phase 215, an optional manual instrumentation phase 216 may be performed. In this phase, the source code 201 of the mobile app is manually enriched with calls to sensor code, libraries containing the mobile agent 107 are added to the mobile app and the project configuration 203 is adapted in a way to support instrumentation based monitoring of the mobile app. Such configuration adaptations may include changes to allow the mobile app to communicate with a monitoring server 120 to send transaction trace and monitoring data. Development phase 215 and manual instrumentation phase 216 may be performed in a sequential or interleaved way. Manual instrumentation is optional and independent of automatic instrumentation, the automatic instrumentation process works also without manual instrumentation. However, the automatic instrumentation process as described herein is capable to cope with already manually instrumented mobile applications and supports coexisting manual and automatic instrumentation. After the manual phases 221 containing the development 215 and optional manual instrumentation 216 phase are finished, an automated or semi-automated build phase 217 is performed. In the build phase 217, a package and build process 205 compiles source code of the application 201 (or in case of manual instrumentation 202) into bytecode format, and creates a deployable, optionally manually instrumented, application package 206. The created application package contains bytecode created out of the source code of the mobile app together with bytecode of libraries used by the mobile application and required to operate it in the runtime environment of a mobile device. The deployable instrumentation package also contains execution relevant configuration data which e.g. determines if the mobile app the required has permissions to communicate with external entities like e.g. a monitoring server.

After the package and build process 205 is finished and a deployable app package 206 is available, the auto-instrumentation preparation phase 218 may be performed, which analyzes the deployable app package 206 to extract code artifacts 207, e.g. in form of bytecode or other intermediate code representing structured portions of the code forming the mobile app, like classes and methods and execution configuration data 208. It is noteworthy that the extracted code artifacts 207 not only contain code artifacts describing the app specific business logic of the mobile app, but also code artifacts describing the functionality of libraries used by the application.

The code artifacts 207 and execution configuration data 208 created during the auto-instrumentation preparation phase 218 are used by the build-time auto instrumentor 209 to perform automatic instrumentation of code artifacts to create automatic instrumented code according to a build-time auto instrumentation configuration repository 214 during an auto-instrumentation phase 219. The build-time auto instrumentor may analyze received code artifacts, extract meta-data like class and method names and class-inheritance relationship data from the code artifacts. This extracted meta-data may be evaluated against instrumentation rules in form of sensor placement descriptions 314 to determine if specific code artifacts should be instrumented. In case the result of this evaluation indicates that the code artifact should be instrumented, it is enriched with sensor code according to matching sensor placement descriptions to form automatic-instrumented code artifacts 210. Existing bytecode manipulation tools may be used to perform the sensor placement.

In addition, the build-time auto instrumentor detects if a mobile app agent 107 is already present in the mobile application and only adds it to the mobile application if no mobile app agent 107 is present.

The existence of a mobile app agent may be determined by extracting meta-data in form of class names and/or package or module names from all code artifacts contained in the deployable application package 206 and compare them with a class name and/or a package or module name specific for the mobile app agent.

In case this check indicates that the deployable app package does not already contain a mobile app agent 107, the build-time auto instrumentor 209 may add code artifacts containing the functionality of the mobile app agent 107 to the set of created code artifacts that are later used to build a deployable automatic-instrumented app package 213.

The build-time auto instrumentor 209 also analyzes the extracted execution configuration 208 and adapts it to enable functionality required by the mobile app agent 107 and specific sensors. The mobile app agent 107 may e.g. require functionality to communicate with an external monitoring server 120, and request sensors 106 may require the functionality to alter payload requests 111 by adding action correlation data 112 before the requests 111 are sent to an application server 114. Although the runtime environment 101 of the mobile device may by default provide all these functionalities, a change to the execution configuration may be required to also grant the monitored mobile app 102 those features.

After the auto-instrumentation phase 219 is finished, and a set of automatically instrumented code artifacts, code artifacts containing the mobile app agent 107 and an execution configuration 211 enabling all functionality required by the deployed sensors and the mobile app agent 107 are available, the automatic-instrumentation post processing phase 220 begins, which uses automatically-instrumented code artifacts 210 and execution configuration 211 in a package and publish process 212 to generate an automatically instrumented, deployable app package 213.

The process described in FIG. 2 may performed or executed either entirely by the organization that develops the monitored application or it may be split by an organization that develops the application and an organization that manages the distribution of mobile applications, like an organization operating an app store. In case of a split execution, the development organization would e.g. perform development 215, manual instrumentation 216 and build phase 217. The resulting deployable application package 206 would then be transferred to an organization operating an app store which would then perform phases 218 to 220. With to split process as described above, app store providers may provide auto instrumentation as an additional service for their application providers.

Referring now to FIG. 3, which contains a block diagram of a build-time auto instrumentor 209 as used in the previously described process. The auto instrumentor contains a code analyzer 307 which extracts code meta-data 304 from incoming bytecode 301 that provides structural information about the incoming bytecode 301. The extracted code meta-data 304 may contain but is not limited to the names of methods implemented by the bytecode, the names of classes containing those methods and information describing inheritance relationships between those classes, like direct and indirect base classes of a class or interfaces implemented by those classes. The code analyzer 307 uses the code meta-data 304 to evaluate sensor placement descriptions 314 and framework instrumentation descriptions 315 stored in an auto instrumentation configuration repository 214. The evaluation of sensor placement descriptions 314 determines if and which sensor code 403 should be instrumented into which parts of received bytecode 301.

As an example, bytecode describing a method "x" of a class "A" that is based on class "B" may be received. The auto instrumentation configuration repository 214 may contain a sensor placement description 402 with target identification data 402 identifying classes derived from a class "B", sensor type 401 and sensor code 403 corresponding to sensor "X" and another sensor placement description 402 identifying methods with name "x" and sensor type 401 and sensor code corresponding to sensor "Y". Evaluation of those sensor placement descriptions 402 would cause instrumentation of sensor "X" to all method of class "A" and instrumentation of sensor "Y" to method "x" of class "A". As a more concrete example, the Android application development infrastructure provides a class "android.app.Activity", which provides basic functionality to manage and display individual screens or views of an Android application. An application developer may derive various other, application specific activity classes from "android.app.Activity" to create views according to desired functionality of the mobile application. Those application specific activity classes may overwrite specific methods of "android.app.Activity" like e.g. a method "onStart( )" or a method "onStop( )". A sensor placement description 314 may e.g. determine that methods "onStart( )" or "onStop( )" of classes deriving from "android.app.Activity" should be instrumented.

Framework instrumentation descriptions 315 may be used to determine if specific application development frameworks (GUI frameworks, communication frameworks etc.) are used by the mobile application that is auto instrumented. The framework identification data 410 of framework instrumentation descriptions 315 may contain names of classes, modules or packages indicating the usage of a specific application development framework. The code analyzer 307 evaluates framework instrumentation descriptions against received code-meta-data to determine if specific frameworks are used by the mobile application. As an example, the mobile application development framework "KonyOne" provided by the company Kony allows to define business logic and GUI of mobile application in a way that is independent of a specific mobile device platform. The KonyOne framework may automatically generate source code for different mobile device platforms like Android, iOS or Windows Mobile®. The framework may also create GUI components that are based on classes that differ from the standard GUI base classes. As an example, GUI component code generated by KonyOne may be based on a different class than e.g. "android.app.Activity". Thus, it is important to detect if a specific mobile application was developed using KonyOne to adapt the automatic instrumentation process accordingly by e.g. additionally using sensor placement descriptions considering those KonyOne specific base classes of GUI components. The determination if a specific Android application is based on the KonyOne framework may be performed by checking if the application contains a class specific for the KonyOne framework. As an example the existence of a class "com.konylabs.android.KonyMain" may be used to for this purpose. In case such a framework is used, the sensor placement descriptions 314 contained in the sensor placement description list 411 of the corresponding framework instrumentation description 315 are also used by the auto instrumentation process.

In case the evaluation of sensor placement description 314 indicates that sensors should be placed in the received bytecode 301, corresponding sensor placement directives 305 describing which sensor code should be placed in which portions of the bytecode are created and sent to the code modifier 302. In addition, the code analyzer 307 creates sensor placement notifications 311 describing which types of sensors are placed and sends them to the configuration analyzer/modifier 317.

The code modifier 302 creates auto instrumented bytecode 303 out of the received bytecode 301 according to the received sensor placement directives 305. The business logic functionality of auto instrumented bytecode 303 is equivalent to the business logic functionality of the received bytecode 301 but in addition it contains code executing sensors that generate measurement and tracing data describing functionality and performance of the instrumented business logic functionality.

The configuration analyzer 317 reads and analyzes the application configuration 313 and on a received sensor placement notification 311, evaluates a configuration adaptation description 316 to determine configuration requirements of the placed sensor. In case the application configuration does not contain all features required by the sensor, it is updated according to the requirements of the sensor. After the auto instrumentation process is finished, the updated application configuration is stored as auto instrumentation adapted application configuration 318.

As an example, a sensor used to tag outgoing requests with transaction correlation data may be placed. The configuration adaptation description may contain data describing that such types of sensors need permission to add request parameters to an outgoing request. The configuration analyzer/modifier 317 may determine if this permission is already granted by the original application configuration and adapt it to contain this permission if it is not yet available. As a result, the auto instrumentation adapted application configuration only contains those features and permissions that are required by instrumented sensors. For Android applications, this may be performed by adding a corresponding "<uses-permission>" entry to the AndroidManifest.xml file of the application. The AndroidManifest.xml file contains the configuration of an Android application.

As another example, a sensor monitoring transitions of the mobile application between foreground mode in which it is visible to the user and receives user inputs and background mode in which it is not visible to the user and also receives no user inputs, may require information about all currently running mobile applications on the device to provide appropriate monitoring data. On a notification of the placement of such a sensor, the configuration analyzer/modifier 317 may fetch the sensor configuration requirements record 430 corresponding to this sensor. The configuration requirements 432 of this record may indicate that the sensor needs access to the list of currently running mobile applications, in form of the corresponding XML entry "<use-permission android:name="android.permission.GET_TASKS">".

The configuration analyzer/modifier 317 may then check the AndroidManifest.xml file for an existing "<use-permission android:name="android.permission.GET_TASKS">" entry and add it when it is missing.

Another example for a sensor requiring specific permissions would be a sensor that measures the number of starts of the monitored mobile applications and the number of crash caused terminations of the application to provide a measurement value indicative for the stability of the application. Such a sensor may e.g. require the additional permission to persistently store the number of previous starts and crashes of the application on a permanent storage of the mobile device.

Data records that may be used to control the auto instrumentation process are shown in FIG. 4. A sensor placement description record 314 is shown in FIG. 4a. Such a record may contain but is not limited to a sensor type 401 identifying the type of the sensor described by the record, target identification data 402 which may be used to identify portions of original bytecode, in form of e.g. names of classes and methods, in which the sensor described by the record should be placed and sensor code 403 containing bytecode fragments that are used to inject the functionality of the described sensor into original bytecode. The sensor code may consist in bytecode dedicated to fetch performance measurement data, like start or end time of a method invocation, bytecode dedicated to retrieve application functionality monitoring data like occurrence of exceptions, bytecode that fetches execution context data, like method parameter or return values, and bytecode dedicated to handover fetched measurement data to mobile agent 107 functionality that handles asynchronous sending of the measurement data to an external monitoring server 120.

A framework instrumentation description 315 as shown in FIG. 4b may contain but is not limited to a framework identification data section 410 and a sensor placement description list 411. The framework identification data section 410 may contain data allowing to identify a specific application development framework by the meta-data extracted from bytecode forming the framework, e.g. in form of specific class names, class name patterns, module or package names or patterns. The sensor placement description list 411 contains a set of sensor placement descriptions 314 specific for the application development framework identified by the framework description data 410. The code analyzer 307 evaluates framework instrumentation descriptions 315 against code meta-data 304 of received bytecode 301. As an example the framework identification data section of a framework instrumentation description 315 to provide instrumentation configuration data for the KonyOne framework could e.g. contain the name of a class specific for this framework, like "com.konylabs.android.KonyMain". In case an application is based on the KonyOne framework, the application also contains classes that are specific for this framework like e.g. the class "com.konylabs.android.KonyMain". In case the code meta-data matches framework identification data 410, then the sensor placement descriptions 314 contained in the sensor placement description list 411 are further considered by the auto instrumentation process. This assures that only sensor placement descriptions 314 specific for application development frameworks that are used by the mobile application are considered by the auto instrumentation process.

The build-time auto instrumentation configuration repository 214 contains sensor placement descriptions 314 that are independent of application development frameworks and that are considered for auto instrumentation regardless if an application development framework is detected or not. The framework instrumentation descriptions 315 contain sets of application development framework specific sensor placement descriptions that are only considered if a specific application development framework is detected.

A configuration adaptation description record 316 as shown in FIG. 4c may contain but is not limited to a set of global configuration requirements 420 and a list of sensor specific requirements 421. The global configuration requirements set 420 may contain e.g. permissions that need to be granted to the mobile application that allow the mobile agent 107 to communicate with an external monitoring server 120. This may also contain configuration data identifying a specific monitoring server in form of e.g. a network address and a port. The sensor specific requirements list 421 describes additional requirements relevant for specific sensors in form of sensor configuration requirements 430. For Android applications, the permission required by the agent to communicate with an external entity over a network is expressed by the XML fragment "<uses-permission android: name="android.permission.INTERNET">", which is added to the AndroidManifest.xml of the application if it is missing. The XML fragment "<uses-permission android: name="android.permission.ACCESS_WIFI_STATE">" describes the permission to read the status of the wireless connection of the mobile device and may be added to the AndroidManifest.xml if a sensor is placed that monitors this status.

FIG. 4*d* describes a sensor configuration requirements record 430 which may contain but is not limited to a sensor type 431 and a configuration requirements section 432. The sensor type 431 may correspond to a sensor type 401 of a sensor placement description and may identify a specific type of sensor. The configuration requirement section 432 describes additional settings required by the specific sensor. Examples for such additional settings are e.g. permissions to alter requests sent by the mobile application to add correlation data to requests as e.g. performed by request sensors 106.

A sensor placement directive 305, which may be used to inform the code modifier 302 that a sensor has to be placed in incoming bytecode 301, is shown in FIG. 4*e*. It may contain but is not limited to a sensor type 441, a target location 442 and sensor code 443. The sensor type 441 corresponds to a sensor type 401 of a sensor placement description 314 and identifies a specific type of sensor. The target location 442 identifies the portion of bytecode into which the sensor is placed, e.g. in form of a class name and a method name. It may in addition identify where in the identified portion of bytecode the sensor has to be placed, like e.g. at the entry point, at all exit points or in code portions processed on the occurrence of exceptions. The sensor code 443 contains or describes bytecode fractions required to inject the functionality of a specific sensor into original bytecode.

A sensor placement notification record 311, as shown in FIG. 4*e*, may be used to inform a configuration analyzer/modifier 317 about a placed sensor and may contain but is not limited to a sensor type 450 corresponding to the sensor type 401 of a sensor placement description 314. On receiving a sensor placement notification record 311, the configuration analyzer/modifier 317 may fetch a sensor configuration requirement record 430 with matching sensor type and then adapt the application configuration to contain the sensor specific configuration requirements 432 described in the fetched sensor configuration requirements record 430.

Referring now to FIG. 5 which shows some exemplary targets for sensors placed by auto instrumentation according to their functionality. Those sensor targets may roughly be divided into application state related 500, user interaction related 510 and communication related 520 targets. Application state related targets may include library or application framework provided functionality corresponding to startup or shutdown 501 of the application, crash of the application 502 or functionality to e.g. to switch from one screen of the application to another. As an example, the application may provide a screen that allows to search for product offerings and another screen allowing to purchase a specific product out of the product set provided by a search performed with the search screen.

Sensors related to startup or shutdown of the application may be placed into functionality related to the startup of the application process indicating the start of the application, into functionality related to the end of the initialization process of the application indicating that the application initialization phase is finished and that the application is ready to serve user requests, in functionality related to the beginning of the application shutdown and the termination of the application process to monitor the shutdown of the application. For Android applications, those sensors may be placed in the default application class "android.app.Application", which may be used if no special startup functionality of the application is required. The application developer may provide its own version of an application class which is derived from "android.app.Application" to cover application specific startup functionality. In case a specific application class should be used instead of the default one, this has to be annotated in the AndroidManifest.xml file by setting the attribute "android:name" of the tag "<application/>" to the name of the specific application class. This "android:name" attribute may be read from a build-time auto instrumentor 209 to identify the class into which startup or shutdown sensors should be instrumented. As the application class is a central building block of the mobile application and gets loaded and executed in an early stage of the startup of the mobile application, it may also be an appropriate location to place code that loads and initializes the mobile agent 107.

In case of existing manual instrumentation, the application class may already be set to a manual instrumentation specific application class, with a specific name like e.g. "instrumented.android.app.Application" which derives from "android.app.Application". This class may already contain sensors and code that loads and initialized the mobile agent 107. The a build-time auto instrumentor 209 may be configured to identify the usage of this monitoring specific application class and in this case skip injecting sensors and code that loads and initializes the mobile agent 107, as this is functionality already available in this case.

Sensors related to switches of application screens may be placed into functionality that closes a currently displayed application screen and opens a new one. The sensor may be triggered on such an event and capture the name of the current and the new screen together with timestamp information describing the point in time when the screen switch occurred.

As an example, in Android applications, screens of an application are represented by classes derived from a base class "android.app.Activity". This class defines a set of methods that are called when the state of a screen changes. An example state of a screen is its visibility to the user. In the state "visible", it is shown on the display of the device and may receive user input. In state "invisible" it is currently hidden from the user and receives no user input. Developers of Android applications may create their own activity classes that are derived from the class "android.app.Activity" and overwrite those methods. The auto instrumentation process may analyze inheritance relationships of classes of the application to identify those classes that are derived from "android.app.Activity" and place sensor code notifying that an activity gets visible or invisible to the overwritten, state-change related method of those derived activity classes.

An Android application may contain multiple classed derived from "android.app.Activity", representing different views of the application. However, only a subset of those activities may be used by the application. This subset of currently used activities is described in the AndroidManifest.xml file by a set of "<activity/>" elements. As an example, an element "<activity adroid:name="MyActivity">" indicates that "MyActivity" is used by the application. The auto instrumentation process may use this configuration data to only instrument activities that are used by the application.

Sensors related to an application crash may be placed in functionality that is executed when an unexpected event occurs during executing application functionality that is not handled by application code and thus causes an unwanted termination of the mobile application. The sensor may be triggered on such an event and notify the crash of the mobile application to the monitoring server 120 before it is terminated. The sensor may alternatively store data describing the crash in a file on the mobile device. This file may be read by the mobile agent on the next start of the application which then notifies the previous application crash to a monitoring server 120.

Sensors related to user interactions may be placed in code related to the visualization of and interaction with graphical user interface elements like button clicks 511, entering text to text boxes 512 or clicking hypertext links 513.

Code or data structures in form of classes that represent those user interface elements may contain data that allows to identify them, e.g. in form of a member variable containing the name specific user interface element, and a class name specific for the type of the user interface element.

Those user interface element classes may provide generic, application independent functionality that handles user interactions, and that triggers the execution of application specific business logic related to the user interface element.

Sensors may be placed in this generic, application independent functionality to capture data identifying the user interface element and data describing execution performance of the business logic code related to the user interaction element and forward this data to the mobile agent 104 e.g. in form of event records 108.

As an example, a first part of a sensor injected to monitor the handling of button triggered activities may be placed in code that is executed in the event of a click on a button. This first part of the sensor may capture context data in form of the name of the button. A second part of the sensor may be placed in a way to be triggered when the business logic execution related to the button is started, and a third part of the sensor may be triggered when execution of the related business logic is finished. In combination, the three parts of the sensor capture context data allowing to identify the button and to identify the business logic portion corresponding to the button and to determine the time required to execute the this business logic. This may be achieved without placing sensors into application specific business logic code.

Communication related functionality, like functionality to send requests 521 and to receive corresponding responses 522 may be placed in generic library or application development functionality that receive data describing requests from the business logic of the application and transform it into a form capable to be sent over a computer network and functionality that receives data from a computer network representing a response and transform it into a form capable to be processed by the business logic of the application. The sensors may be triggered when a request is sent or a response is received, capture data describing and identifying the request or response and send this identification data to the mobile agent 107. As an example, for HTTP requests, the URL of the HTTP request may be captured by the sensor and provided as context data describing the request. Sensors related to the sending of requests may in addition add correlation data allowing to identify the activity performed on the mobile application that caused the sending of the requests to the request that is sent e.g. to a monitored application server 114. In case of HTTP request, this correlation data may be added to the request by adding a request header field with a name known to agents potentially placed in a monitored server application receiving the request. The value of this header field may be set to identify the instance of the mobile application that sent the request and the activity performed on the mobile application causing the request. Sensors instrumented to the monitored application server receiving the request may extract this correlation data from the request header field, which is later sent to a monitoring server 120 together with tracing data describing the server side processing of the request. This allows to correlate tracing data describing mobile app side activity with corresponding trace data describing server side response handling activities.

The sensors placed by the automatic instrumentation process may be injected into generic, application independent code that is used by application specific business logic code to provide the functionality of the application. Those sensors are executed when the generic functionality is called and they acquire, beneath measurement data describing performance and functionality aspects of the execution of specific application functionality, also context data allowing to identify which part of application business logic called the instrumented generic library code.

As an example, Android application typically use a method "execute( )" with a parameter of type "HttpUriRequest" and a return value of type "HttpResponse" in a class "android.net.http.AndroidHttpClient" to send HTTP requests and receive HTTP responses. The automatic instrumentation process may identify the bytecode corresponding the method "execute( )" of this method and adapt it in a way that it executes, in addition to code that performs HTTP based communication, sensors that provide monitoring and context data describing performed HTTP communication. A first portion of this sensor may be placed at the entry of the "execute( )" method to capture the URL provided by the "HttpUriRequest" parameter, and to record the start of the execution of the "execute( )" method. A second portion of the sensor may be placed at the exit of the "execute( )" method to record the end of the execution of the "execute( )" method. Together both parts of the sensor may provide context data of the HTTP request in form of the URL of the request combined and performance data describing the time required to receive the requested response.

A flow chart that describes the process of transforming a not instrumented or manually instrumented mobile application into an automatically instrumented mobile application is shown in FIG. 6.

The process starts with step 601 when a deployable package 206 of a mobile application containing build code artifacts 207 and execution configuration 208 is available for automatic instrumentation. It is noteworthy that the received build artifacts and execution configuration may already contain changes caused by manual instrumentation. Following step 602 extracts code artifacts 207 and execution configuration 208 from the deployable package 206 and subsequent step 603 analyzed code artifacts and execution configuration to determine if a mobile agent 107 is already contained in the mobile application. In case the mobile application already contains a mobile agent 107, e.g. due to manual instrumentation, the process continues with step

607. Otherwise, step 605 is executed which adapts the execution configuration 208 to support requirements of the mobile agent 107 and of instrumentation base monitoring in general. As an example, step 605 may allow the mobile application 102 and in turn the mobile agent 107 to communicate with a monitoring server 120. For Android applications, this would e.g. include adding the entry "<uses-permission android:name="android.permission.INTERNET">" to the AndroidManifest.xml file.

Following step 606 adapts the code contained in build artifacts to contain the mobile agent 107 and to initialize and start the mobile agent on startup of the mobile application 102. This may also include reading configuration data corresponding to the mobile agent 107 on startup, containing e.g. a network address and port which may be used by the mobile agent to communicate with a monitoring server 120. Step 606 may also include transforming a mobile agent representation available in conventional bytecode, into a representation in bytecode specific for execution on mobile devices.

Afterwards, step 607 is executed which analyzes build artifacts in form of bytecode to extract meta-data describing portions of the bytecode and to inject sensor code according to the automatic instrumentation configuration 214. For a detailed description of this step see the process described in FIG. 7. Subsequent step 608 performs post processing steps that generate an automatic instrumented deployable package 213 containing the mobile application out of configuration data adapted to support automatic instrumentation 211 and automatic instrumented code artifacts 210. The post processing step may include packaging application code and configuration data into a file, structured according to conventions for installable files for a specific target mobile environment (e.g. the Android environment), compressing and signing the installable file. The process then ends with step 609.

FIG. 7 describes the process of automatically instrumenting code artifacts in form of bytecode dedicated for execution on mobile devices.

The process starts with step 701, when build artifacts in form of bytecode and configuration data prepared for automatic instrumentation area available. In subsequent step 702 the code analyzer 307 extracts meta-data 304 from the bytecode 301 and evaluates it against framework identification data 410 of framework instrumentation descriptions 315 in automatic instrumentation configuration 219. The extracted meta-data 304 may contain names of classes, names of interfaces implemented by those classes and names of packages or modules containing those classes. The framework identification data 410 may consist in patterns identifying the names of classes, interfaces, packages or modules that are specific for individual frameworks. In case extracted meta-data 304 is matching the framework identification data 410 of a framework instrumentation description 315, then the sensor placement descriptions 314 in its sensor placement description list 411 are used for the automatic instrumentation process.

Following step 703 extracts code fragments and code fragment meta-data from build artifacts suitable for instrumentation. The existing code fragments may represent methods of classes and the extracted code fragment meta-data may consist in the name of the methods, the classes containing the methods, the names of interfaces implemented by those classes and of packages and modules containing the classes. As an example, an Android application may be available in form of an Android application (APK) file. Such an APK file contains application configuration data in form of an AndroidManifest.xml entry, and a classes.dex entry that contains all classes of the mobile application in a bytecode format for a virtual machine optimized for mobile devices (e.g. a Dalvik virtual machine). A concrete implementation of step 703 would e.g. extract the classes.dex file from the APK file, and then extract the bytecode representing different classes and methods of those classes from the classes.dex file (bytecode of methods of classes may also be referred to as code fragments from build artifacts suitable for instrumentation). Similar to conventional bytecode, the bytecode contained in classes.dex files, contains descriptive meta-data that allows to reconstruct names of methods and classes, method signatures, inheritance and interface implementation relationships.

In following step 704, the code analyzer 307 checks for extracted meta-data if it matches any target identification data 402 of sensor placement descriptions 314 that should be used for the automatic instrumentation process.

This may include sensor placement descriptions independent of any application development framework and sensor placement descriptions of framework instrumentation descriptions identified in step 702, As an example, for Android applications and for a sensor dedicated to monitor clicks on the user interface of the monitored application, the target identification data may specify the interface name "android.viewView.OnClickListener" and may determine that classes implementing this interface should be instrumented. Further, the target identification data may specify that methods with the name "onClick( )", with one method parameter of type "android.view.View" should be instrumented. In case meta-data of a class of the mobile application is received, names of all interfaces implemented by this class are extracted and it is checked if the interface "android.viewView.OnClickListener" is implemented. Further it is checked if the received class contains a method "onClick( )" with one parameter of type "android.view.View". In case such a method exists in the received class and it implements the desired interface, the method is selected for instrumentation.

Afterwards, in step 705, the code analyzer creates sensor placement directives 305 for each match of a target identification data and extracted code meta-data. Sensor type 441 and sensor code 443 are set to the corresponding fields of the matching sensor placement description 314 and target location 442 is set to the matching code meta-data 304. The created sensor placement directives 305 are sent to the code modifier 302.

In step 706, the code modifier 302 receives the sensor placement directives 305, identifies the bytecode fragments corresponding to the target location 442 of the received sensor placement directives 305, and places sensor code as described in the sensor code field 443 of the sensor placement directive into the matching bytecode fragment.

To continue the above example describing sensors dedicated to monitor clicks on the user interface of the monitored application, the code modifier may e.g. inject code into the method "onClick( )" that first inspects the received parameter "View" to e.g. capture the name of the class of the parameter and the value of the property that identifies the "View" object within the monitored application. In the Android ecosystem, the class "View" is the base class of various types of user interface components like buttons, text fields etc. and the "View" parameter passed to the "onClick( )" button represents the user interface component that was clicked.

Capturing the class name allows to determine the type of user interface which was clicked and the identifying property allows to identify the specific user interface element instance that was clicked. Class name and identification property may be provided by the sensor as context data.

Further, code may be injected at the entry and at all exits of the "onClick( )" method to detect and report start and end of an execution of an "onClick( )" method.

Afterwards, in step 707, the code analyzer creates sensor placement notifications 311 for each code meta-data matching a target identification data of a sensor placement description and sets the sensor type 450 to the sensor type 401 of the corresponding sensor placement description 314. The sensor placement notifications are sent to the configuration analyzer/modifier 317.

The configuration analyzer/modifier 317 receives the sensor placement notifications 311 in step 708 and fetches corresponding sensor specific configuration requirement records 430 from the automatic instrumentation configuration 219. Corresponding sensor specific configuration requirement records 430 may be identified by a matching sensor type 431. Afterwards, the configuration analyzer/modifier 317 updates the automatic instrumentation adapted application configuration data 318 to support configuration requirements 432 of identified sensor configuration requirement records 430.

Step 709 checks if subsequent bytecode fragments for automatic instrumentation are available in the code artifacts of the mobile application. If such are available, the process continues with step 703. Otherwise, it ends with step 710.

In an embodiment dedicated to the instrumentation of Android applications, step 709 may check if all classes contained in the classes.dex file have been processed.

A variant of an automatic instrumentation process for mobile applications 102 dedicated for mobile runtime environment that are not based on bytecode or bytecode derivate execution, but provide features that allow exchange of method names and method functionality at runtime, as e.g. mobile runtime environments based on the Objective-C programming language, like e.g. the iOS operating system provided by Apple® is described in FIG. 8.

The process starts with step 801 when the development of the mobile application begins. Check 802 determines if the mobile application to be developed should also be manually instrumented. In case no manual instrumentation is required, the process continues with step 803 in which the mobile application is designed and developed by software engineers. Afterwards, the process continues with step 808.

In case manual instrumentation is desired, the process switches to step 804 in which the application development environment may be adapted to support manual instrumentation. This may include adding code libraries containing the mobile agent 107 in a variant capable for operating in a non-bytecode based mobile application to the mobile application and adapting the application configuration to support instrumentation based monitoring.

Afterwards, step 805 in which application functionality is developed and step 806, in which application code is enriched with manually placed sensor calls may be performed alternately, until it is decided in check 807 that development and manual instrumentation of the mobile application is finished. In this case, the process continues with step 808.

In step 808, the application development environment is adapted to support automatic instrumentation if this is required. This may consist in adding code libraries containing the mobile agent 107 in a variant capable for non-bytecode based mobile application to the application development environment. The mobile agent 107 variant already contains sensor code and functionality to identify and adapt specific sensor target code to also execute sensor code. In case of performed manual instrumentation, the mobile agent 107 variant may already be part of the mobile application. In some variants, infrastructure functionality required by sensors to e.g. communicate with an external monitoring server and functionality required for automatic instrumentation may reside in different code libraries. This would allow to add only the code library containing sensor infrastructure functionality to the application if only manual instrumentation is desired, and add both code libraries in case of desired automatic instrumentation or combined manual and automatic instrumentation.

In subsequent step 809, the mobile application is built, packaged and deployed to a mobile device and is then ready for execution.

Afterwards, the mobile application 102 is started on the mobile device in step 810, which triggers step 811 that starts and initializes the mobile agent 107 and registers the mobile agent to get notified on the loading of executable code.

In Objective-C environments like e.g. iOS, specific methods of classes, like static 'load' methods are called when a library is loaded by an application. By placing code that starts and initializes the mobile agent 107 and the instrumentor 906 in such a static "load" method, it would get automatically initialized without requiring further manual interference like changing source code, except linking the specific agent and/or instrumentator libraries to the mobile application.

Some variants of iOS environments may not provide features that allow dynamic loading of classes at runtime and in consequence do also not provide notification mechanisms that could e.g. be used to inform an instrumentor 906 about loading of a class. However, such environments provide functions that allow to list all classes of an application, like e.g. the method "objc_copyClassNamesForImage" which may be used to retrieve all classes of a mobile application. In case of a missing class loading notification mechanism, an instrumentor may on startup fetch names of all classes by calling the method "objc_copyClassNamesForImage", and then iterate over the returned class name list to fetch additional meta-data for those classes. In Objective-C, methods like "objc_getClass" may be used to get a data structure representing a class for a class name, methods like "class_getSuperclass" may be used to determine inheritance relationships and method like "class_copyMethodList" may be used to list the methods of a specific class. Extracted meta-data may be used to determine if specific classes out of the list of classes of the mobile application should be instrumented.

Other variants of iOS environments may allow dynamic loading of class bundles containing a set of classes. Loading of those class bundles is typically managed by a class "NSBundle". Static methods like "bundleWithPath" or "bundleWithURL" of this class are typically used to dynamically load class bundles into an application. An automatic instrumentation process may manipulate those methods using techniques that exchange of method names and method functionality as described later in a way that after a call to "bundleWithPath" or "bundleWithURL" is executed to load a class bundle, a call to "objc_copyClassNamesForImage" limited to the scope of the just loaded bundle is performed to get the classes of the bundle. Afterwards, meta-data of the classes in the bundle may be gathered.

In both cases, the gathered meta-data may be evaluated against instrumentation configuration data 907 to determine classes and methods that should be instrumented.

In case of an existing class loading mechanism, step 812 is executed each time a new class is loaded and the mobile agent 107 gets notified about loading of this class. In case of no existing class load mechanism and no notification mechanism indicating the loading of classes, step 812 is executed for each class in a list of all classes of the application determined at the startup of the application.

The mobile agent 107 uses runtime available meta-data describing the loaded executable code, like names of methods and names of classes containing those methods and inheritance data of those classes describing e.g. direct and indirect base classes of those classes, to determine if the executable code should be instrumented. Some embodiments may in addition use meta-data describing the protocols implemented or adopted by a class. In Objective-C, protocols have a similar role than interfaces in Java, they declare a group of related methods. By adopting or implementing a protocol or interface, a class provides method implementations for the method declarations specified in the protocol or interface. Instrumentation is performed using runtime available code modification mechanisms, like e.g. the possibility to exchange method code corresponding to method names or identifiers during application runtime. Runtime environments for mobile applications based on Objective-C, like the mobile operating system iOS manufactured by Apple® provide such features. It is noteworthy that these features are not restricted to the Objective-C programming language. Also mobile applications written in other programming languages like e.g. the programming language Swift® provided by Apple® may be instrumented using those features. The feature of exchanging method names and method code parts of two methods during runtime is also referred to as method swizzling.

For Objective-C based applications dedicated to run in an iOS environment, classes related to views of a mobile application are derived from a basis class "UIViewController". This class provides methods like "viewDidLoad", "viewWillAppear" or "viewWillDissapear" that are called on state changes of a view, like when it was loaded, became visible or invisible. Application specific view classes may overwrite those methods and an automatic instrumentation feature may identify such classes deriving from "UIViewController" and place sensors in overwritten methods. Functionality provided by the Objective-C runtime environment like "method_setImplementation" that exchanges executable code referred by a method name, may be used to exchange method code to inject sensors.

Same mechanisms may be used to identify and instrument classes and methods related to GUI elements like buttons or text fields and to instrument classes and methods related to HTTP based communication. Example base classes that may be used to identify GUI elements may include "UIControls", and to identify and instrument corresponding handler classes for user interface events. To place sensors that monitor HTTP based communication, methods of the class "NSURLRequest" may be enriched with sensor code.

Following step 813 executes the automatically instrumented code as part of the mobile application 102 which provides measurement data describing functionality and performance of the mobile application. The process then ends with step 814.

A conceptual overview of a mobile execution environment providing dynamic class loading features and class loading notification mechanisms, that is executing an automatically instrumented non-bytecode based mobile application is shown in FIG. 9.

A mobile device and restricted runtime environment 101 variant dedicated to execute non-bytecode based mobile applications 102 and providing features to swap method code corresponding to method names during runtime, like mobile devices running the mobile operating system iOS, is running a monitored mobile application 102. During execution, the mobile application 102 interacts with a runtime environment 902 to request loading of code 903 from an application code library 904 containing the code of the mobile application residing on the file system of the mobile device for execution. An instrumentor 906, being part of a mobile agent 107 in a variant capable for non-bytecode based mobile applications, is registered to get notified on loading of executable code. On such a notification 909, the instrumentor 906 may use meta-data describing portions of loaded code, like names of methods and names of classes containing the methods, to determine if methods should be instrumented. The instrumentor 906 may search for matching method swap code 908 in an instrumentation configuration repository 907. Method swap code may be identified by a method name and the name of a class containing the method and class inheritance data, and may consist in code that calls sensor code in addition to original method code if its method code is swapped by the original method code. Conceptually, the data stored in the configuration repository 907 is equivalent to a set of sensor placement descriptions 314 used by the built time auto instrumentor 209, as the instrumentor 906 also requires data identifying target code, similar to target identification data 402 to determine the position of original code into which a sensor should be placed, and sensor code or instructions determining how to place a sensor in target code. The sensor placement descriptions 314 as used by the build time auto instrumentor 209 are typically available in form of configuration data stored outside of the target application or the instrumentor process and are suitable in some environments. For monolithic, runtime instrumentation based variants as described in FIGS. 8 and 9, the data of the instrumentation configuration may be provided in form of executable code. As an example, the target identification data may be implemented as a set of "if" statements, each of those "if" statements evaluating extracted meta-data by e.g. comparing extracted method, class or protocol names against a set of predefined constants. In case such an "if" statement detects a match, code that performs the code swapping based instrumentation of the target is performed. This code corresponds to the sensor code field 403 used in the build time instrumentation variants. The code contained in the configuration repository 907 determines which portions of the application code should be replaced by instrumented code and may therefore also be referred to as replacement code.

In case matching swap code is found, the instrumentor 906 sends a request 905 to the runtime interface 902 to swap method code of the original loaded method with the method swap code. Afterwards, the loaded and potentially swapped and thus instrumented code is forwarded to the monitored mobile application 102 for execution.

The feature of swapping method code corresponding to method names, and to use this feature to create instrumented code is graphically described in FIG. 10.

FIG. 10a shows the state of instrumentation target code 1003 and swap code 1004 before the swap process was performed. The application logic code 1001, representing a part of the functionality of the application calls 1002 specific instrumentation target code 1003, which is still executed without instrumentation. The corresponding swap code 1004 contains a call to a sensor 1005, followed by a call to the swap code itself 1006 and a call to another sensor 1007. In this state the swap code 1004 is not executed and calling the swap code would cause an endless recursion and in turn crash the application.

The state after the swap process was performed is shown in FIG. 10*b*. The swap process exchanges the executable code corresponding to two method names with each other without changing the method names used to call the methods. In this state, the application logic 1001 performs the same as before, but as the method code has been swapped, it now calls 1008 the swap code 1004 instead of the instrumentation target code 1003 directly. The swap code 1004 first calls sensor code 1005 as before, but the self-call 1009 is redirected due to the method swapping process to the instrumentation target code 1003. As a result, in case the application logic code 1001 now performs the call to the instrumentation target code 1003, it first calls the corresponding swap code 1004, which performs calls to sensor code before and after executing the instrumentation target code 1003.

The swapping of target code and swap code is performed in a way that does not influence the business logic functionality of both calling application logic code 1001 and instrumentation target code 1003. Method parameters and return values are passed through the swap code without changing them, the method signatures of methods representing swap code and instrumentation target code are equivalent and the behavior of instrumentation target code after swapping is identical to its behavior before swapping. As a more concrete example, original code may call a method named "basic function" that contains code "a". Swap code in form of a method called "basic function wrapper" may exist that before the swapping contains code that calls sensors and the method "basic function wrapper" itself. After swapping, the code executed by "basic function" and "basic function wrapper", a call to "basic function" now contains code that executes sensors and calls the function "basic function wrapper". As "basic function wrapper" now contains the original target code, the resulting functionality after swapping now executes original code and sensor code.

User interactions performed on mobile applications like clicking a button, or changing a view typically, cause communication with backend functionality in form of e.g. sending HTTP requests and receiving HTTP responses. Transaction tracing and monitoring data should also represent those causal relationships between user activity and communication to ease analysis and to allow quick identification of the root cause of performance issues. As an example, providing this causal relationship allows to identify specific user activities that cause an unusual high amount of HTTP requests and are therefore slow. Such information is of high value to detect and fix the root cause of performance issues.

The correlation of monitored user activities with monitored communication activities caused by those user activities may in some embodiments be performed using timing data of detected user interaction and sent requests. In case of a detected user interaction, a sensor may record the point in time when the user interaction was performed and store data identifying the user interaction and its execution time at a location that is also accessible by other sensors, e.g. in the mobile agent 107. When sensors that monitor HTTP communication get executed, they may access the data identifying the last performed user interaction and, in case the HTTP communication was performed within a specific time window (e.g. up to 200 milliseconds after the user interaction) after the monitored user interaction, send this data together with other context information to a monitoring server 120. The monitoring server may then use this additional context data identifying a user action that is sent with the monitoring data describing HTTP communication to correlate tracing and monitoring data describing the user activity with the tracing and monitoring data describing the HTTP communications caused by the user activity.

Other embodiments may identify and follow the thread context in which monitored user activities are handled, and identify and tag monitored HTTP communications performed within the same thread context. To follow the thread context, a sensor monitoring user activity may use thread locals, that allow to store data within the context of an execution thread and that make it available for subsequent method executions in a thread. The user activity sensor may store data identifying the user activity in the thread local and subsequent sensors monitoring HTTP communications within the same thread may use the data stored in the thread local storage to tag created tracing and monitoring data with data that identifies the causing user activity.

Even if above described embodiments may differ in terms of technology used to realize an automated instrumentation of an application, both create a modified application installation file that next to installing the application on a device for execution, prepare the installation file in a way that the application is executed in an instrumented way, creates transaction monitoring and tracing data and sends the created data to a monitoring server, without the need of an interaction with the person that installs and uses the application or without the person even knowing that the application is instrumented.

Some portions of the above description present the techniques described herein in terms of algorithms and symbolic representations of operations on information. These algorithmic descriptions and representations are the means used by those skilled in the data processing arts to most effectively convey the substance of their work to others skilled in the art. These operations, while described functionally or logically, are understood to be implemented by computer programs. Furthermore, it has also proven convenient at times to refer to these arrangements of operations as modules or by functional names, without loss of generality.

Unless specifically stated otherwise as apparent from the above discussion, it is appreciated that throughout the description, discussions utilizing terms such as "processing" or "computing" or "calculating" or "determining" or "displaying" or the like, refer to the action and processes of a computer system, or similar electronic computing device, that manipulates and transforms data represented as physical (electronic) quantities within the computer system memories or registers or other such information storage, transmission or display devices.

Certain aspects of the described techniques include process steps and instructions described herein in the form of an algorithm. It should be noted that the described process steps and instructions could be embodied in software, firmware or hardware, and when embodied in software, could be downloaded to reside on and be operated from different platforms used by real time network operating systems.

The present disclosure also relates to an apparatus for performing the operations herein. This apparatus may be specially constructed for the required purposes, or it may comprise a general-purpose computer selectively activated or reconfigured by a computer program stored on a computer readable medium that can be accessed by the computer. Such a computer program may be stored in a tangible computer readable storage medium, such as, but is not limited to, any type of disk including floppy disks, optical disks, CD-ROMs, magnetic-optical disks, read-only memories (ROMs), random access memories (RAMs), EPROMs, EEPROMs, magnetic or optical cards, application specific integrated circuits (ASICs), or any type of media suitable for storing electronic instructions, and each coupled to a computer system bus. Furthermore, the computers referred to in the specification may include a single processor or may be architectures employing multiple processor designs for increased computing capability.

The algorithms and operations presented herein are not inherently related to any particular computer or other apparatus. Various general-purpose systems may also be used with programs in accordance with the teachings herein, or it may prove convenient to construct more specialized apparatuses to perform the required method steps. The required structure for a variety of these systems will be apparent to those of skill in the art, along with equivalent variations. In addition, the present disclosure is not described with reference to any particular programming language. It is appreciated that a variety of programming languages may be used to implement the teachings of the present disclosure as described herein.

The present disclosure is well suited to a wide variety of computer network systems over numerous topologies. Within this field, the configuration and management of large networks comprise storage devices and computers that are communicatively coupled to dissimilar computers and storage devices over a network, such as the Internet.

Further areas of applicability will become apparent from the description provided herein. The description and specific examples in this summary are intended for purposes of illustration only and are not intended to limit the scope of the present disclosure.

The foregoing description of the embodiments has been provided for purposes of illustration and description. It is not intended to be exhaustive or to limit the disclosure. Individual elements or features of a particular embodiment are generally not limited to that particular embodiment, but, where applicable, are interchangeable and can be used in a selected embodiment, even if not specifically shown or described. The same may also be varied in many ways. Such variations are not to be regarded as a departure from the disclosure, and all such modifications are intended to be included within the scope of the disclosure.

What is claimed is:

1. A computer-implemented method for automatically instrumenting software applications intended for a restricted execution environment, comprising:
   receiving, by an instrumentor, incoming bytecode for a target application;
   extracting, by the instrumentor, metadata from the incoming bytecode;
   evaluating, by the instrumentor, the metadata in relation to each of a plurality of sensor placement descriptors, where each sensor placement descriptor includes a sensor type, identification data for placement of a sensor and bytecode for a sensor;
   inserting, by the instrumentor, bytecode for a particular sensor from a given sensor placement descriptor into the incoming bytecode at a location prescribed by the identification data from the given sensor placement descriptor, where the insertion of bytecode for a particular sensor occurs prior to execution of the target application and in response to the metadata from the incoming bytecode correlating to the identification data from the given sensor placement descriptor;
   receiving, by the instrumentor, a configuration file for the target application;
   determining, by the instrumentor, permission needed to execute the bytecode for the particular sensor;
   determining, by the instrumentor, the permission is granted by the configuration file;
   adding, by the instrumentor, a permission entry to the configuration file in response to an absence of the permission in the configuration file, where the permission entry enables execution of the bytecode for the particular sensor; and
   packaging the instrumented bytecode for distribution, where the instrumentor is executed by processor-readable instructions executed by a computer processor of a computing device.

2. The method of claim 1 further comprises
   determining, by the instrumentor, the incoming bytecode is instrumented with an agent;
   inserting, by the instrumentor, bytecode for an agent into the incoming bytecode, where the insertion of bytecode is in response to a determination that the incoming bytecode is not instrumented with an agent; and
   adapting the configuration file to enable execution of the bytecode for the agent.

3. The method of claim 2 wherein determining the incoming bytecode is instrumented with an agent further comprises extracting one or more of class names, modules names and package names from the incoming bytecode and comparing the one or more of class names, modules names and package names with a name for the agent.

4. The method of claim 1 wherein the identification data for placement of a sensor is further defined as name of a method implemented by the incoming bytecode or a name of a class containing methods implemented by the incoming bytecode.

5. The method of claim 4 wherein the identification data for placement of a sensor is further defined as an inheritance relationship between a parent class and a child class, and evaluating metadata further comprises identifying select classes in the incoming bytecode that correspond to the child class and inserting bytecode for the particular sensor into the select classes in the incoming bytecode.

6. The method of claim 5 wherein evaluating the metadata further comprises determining a specific application development framework is used by the target application from the metadata and evaluating additional sensor placement descriptors for the specific application development framework, where the evaluation of the additional sensor placement descriptors is in response to determination that the specific application development framework is used by the target application.

7. The method of claim 4 wherein the identification data for placement of a sensor is further defined as an interface, and evaluating the metadata further comprises identifying select classes in the incoming bytecode that implement the interface and inserting bytecode for the particular sensor into the select classes of the incoming bytecode.

8. The method of claim 1 further comprises downloading the instrumented bytecode from the computing device into a restricted execution environment of a mobile computing device.

9. The method of claim 1 further comprises executing the instrumented bytecode in a restricted execution environment of a computing device, wherein the bytecode for the particular sensor determines a metric indicative of performance of the target application and sends an event message via an agent to a server located remotely from the computing device, wherein the event message includes the metric.

10. The method of claim 9 wherein the permission entry in the configuration file grants permission to the particular sensor to access data for determining the metric and the permission is given by an operating system according to the configuration file.

11. The method of claim 9 wherein the permission entry in the configuration file grants permission to the agent to send the event message and the permission is given by an operating system according to the configuration file.

12. A computer-implemented system for automatically instrumenting software applications intended for a restricted execution environment, comprising:
 a computer processor;
  a data store that stores a plurality of sensor placement descriptors, where each sensor placement descriptor includes a sensor type, identification data for placement of a sensor and bytecode for a sensor;
  a code analyzer configured to receive incoming bytecode for a target application and, in response to receiving the incoming bytecode, extract metadata from the incoming bytecode and evaluate the metadata in relation to each of the plurality of sensor placement descriptors;
  a code modifier interfaced with the code analyzer and operates to insert bytecode for a particular sensor from a given sensor placement descriptor into the incoming bytecode at a location prescribed by the identification data from the given sensor placement descriptor, where the insertion of bytecode for a particular sensor occurs prior to execution of the target application and in response to the metadata from the incoming bytecode correlating to the identification data from the given sensor placement descriptor; wherein the code analyzer and the code modifier are processor-readable instructions executed by the computer processor; and
  a configuration analyzer configured to receive a configuration file for the target application and, in response to receiving the configuration file, determining, permission needed to execute the bytecode for the particular sensor, determining the permission is granted by the configuration file, and adding a permission entry to the configuration file in response to an absence of the permission in the configuration file, where the permission entry enables execution of the bytecode for the particular sensor.

13. The system of claim 12 wherein the code analyzer determines the incoming bytecode is instrumented with a mobile agent; and the code modifier, in response to a determination that the incoming bytecode is not instrumented with an agent, inserts bytecode for an agent into the incoming bytecode, wherein the mobile agent determine a performance metric for the target application and sends an event message to a server located remotely from a computing device executing the target application.

14. The system of claim 13 wherein the code analyzer determines the incoming bytecode is instrumented with a mobile agent by extracting one or more of class names, modules names and package names from the incoming bytecode and comparing the one or more of class names, modules names and package names with a name for the mobile agent.

15. The system of claim 12 wherein the identification data for placement of a sensor is further defined as name of a method implemented by the incoming bytecode or a name of a class containing methods implemented by the incoming bytecode.

16. The system of claim 15 wherein the identification data for placement of a sensor is further defined as an inheritance relationship between a parent class and a child class, and the code analyzer evaluates metadata by identifying select classes in the incoming bytecode that correspond to the child class and inserting bytecode for the particular sensor into the select classes in the incoming bytecode.

17. The system of claim 16 wherein the code analyzer further evaluates the metadata by determining a specific application development framework is used by the target application from the metadata and evaluating additional sensor placement descriptors for the specific application development framework, where the evaluation of the additional sensor placement descriptors is in response to determination that the specific application development framework is used by the target application.

* * * * *